US008281068B2

(12) United States Patent
Kono et al.

(10) Patent No.: US 8,281,068 B2
(45) Date of Patent: Oct. 2, 2012

(54) CONFIGURATION OPTIMIZATION METHOD FOR A STORAGE SYSTEM

(75) Inventors: Yasutaka Kono, Yokohama (JP);
Daisuke Shinohara, Yokohama (JP);
Nobuhiro Maki, Yokohama (JP);
Yukinori Sakashita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 640 days.

(21) Appl. No.: 12/029,125

(22) Filed: Feb. 11, 2008

(65) Prior Publication Data

US 2009/0119529 A1 May 7, 2009

(30) Foreign Application Priority Data

Nov. 2, 2007 (JP) .................................. 2007-285932

(51) Int. Cl.
*G06F 12/00* (2006.01)
(52) U.S. Cl. .. 711/114; 711/162; 711/170; 711/E12.081
(58) Field of Classification Search ......................... None
See application file for complete search history.

(56) References Cited

U.S. PATENT DOCUMENTS

| 7,734,867 B1 * | 6/2010 | Keeton et al. ................. 711/114 |
| 2003/0204597 A1 * | 10/2003 | Arakawa et al. .............. 709/226 |
| 2004/0215879 A1 | 10/2004 | Matsunami et al. |
| 2005/0091455 A1 | 4/2005 | Kano et al. |
| 2005/0111249 A1 | 5/2005 | Yagisawa et al. |
| 2006/0095664 A1 * | 5/2006 | Wichelman et al. .......... 711/114 |
| 2006/0179220 A1 * | 8/2006 | Soejima et al. ............... 711/114 |

FOREIGN PATENT DOCUMENTS

| JP | 2002-222061 A | 8/2002 |
| JP | 2003-015915 A | 1/2003 |
| JP | 2005-157710 A | 6/2005 |

OTHER PUBLICATIONS

Japanese Office Action corresponding to Japanese Patent Application No. 2007-285932, dated Feb. 14, 2012.

* cited by examiner

*Primary Examiner* — Matthew Bradley
*Assistant Examiner* — Arvind Talukdar
(74) *Attorney, Agent, or Firm* — Sughrue Mion, PLLC

(57) ABSTRACT

This invention provides, when optimizing a configuration of a storage system using a pool, an optimal configuration while ensuring a policy set by an administrator, the policy concerning a power saving performance, a response performance, or the like. The management computer sets, according to the set policy, priorities to volumes held by a storage subsystem, and reserves volumes satisfying the capacity of the pool, in descending order of the priority. Only some of the reserved volumes are registered for the pool in descending order of the priority. At this time, it can be guaranteed that a host computer makes no access to the volumes which have not been registered for the pool, and therefore the sleep state is set to physical drives forming the volumes or to a controller controlling the physical drives.

17 Claims, 16 Drawing Sheets

VOLUME MANAGEMENT TABLE 224

| DEVICE ID | LUN | CONTROL UNIT ID | DISK ID | POWER SUPPLY STATUS | CAPACITY | DISK TYPE | USE STATUS |
|---|---|---|---|---|---|---|---|
| USP_V.0 | 0 | 0 | 0, 1 | ON | 20GB | FC | IN USE |
| USP_V.0 | 1 | 0 | 2, 3 | SLEEP | 10GB | FC | NOT IN USE |
| USP_V.0 | 2 | 1 | 4 | ON | 5GB | SATA | RESERVED |
| USP_V.0 | 3 | 2 | 5 | ON | 5GB | SATA | IN USE |

*FIG. 2*

RESERVATION CRITERION TABLE 225

| DEVICE ID | RESOURCE ID | CAPACITY | THRESHOLD VALUE | RESERVATION CRITERION (TOTAL: 10) | | | |
|---|---|---|---|---|---|---|---|
| | | | | POWER SAVING | RESPONSE PERFORMANCE | LOW COST | ACCESS BALANCING DEGREE |
| USP_V0 | POOL1 | 300GB | 70% | 8 | 0 | 2 | 0 |
| USP_V0 | POOL2 | 100GB | 70% | 0 | 6 | 0 | 4 |

SCORE TABLE 226

| DEVICE ID | LUN | SCORE | | | |
|---|---|---|---|---|---|
| | | POWER SAVING | RESPONSE PERFORMANCE | LOW COST | ACCESS BALANCING DEGREE OF POOL Vol |
| USP_V.0 | 0 | 1/2 | 1 | 0 | 1/20 |
| USP_V.0 | 1 | 0 | 1/2 | 0 | 2/20 |
| USP_V.0 | 2 | 1/2 | 1/2 | 1 | 4/20 |
| USP_V.0 | 3 | 1/2 | 1/2 | 1 | 4/20 |

*FIG. 4*

RESERVATION MANAGEMENT TABLE 227

| RESOURCE ID | ORDER OF PRIORITY | DEVICE ID | LUN |
|---|---|---|---|
| POOL 1 | 1 | USP_V.0 | 2 |
| | 1 | USP_V.0 | 3 |
| | 2 | USP_V.0 | 0 |
| | 3 | USP_V.0 | 1 |
| POOL 2 | 1 | USP_V.0 | 0 |
| | 2 | USP_V.0 | 2 |
| | 2 | USP_V.0 | 3 |
| | 3 | USP_V.0 | 1 |

*FIG. 5*

VOLUME MANAGEMENT TABLE HAVING EXTERNAL CONNECTION INFORMATION 224b

| DEVICE ID <br> 2240b | LUN <br> 2241b | CONTROL UNIT ID <br> 2242b | EXTERNAL CONNECTION DESTINATION UNIT ID <br> 2243b | DISK ID <br> 2244b | POWER SAVING FUNCTION <br> 2245b | POWER SUPPLY STATUS <br> 2246b | CAPACITY <br> 2247b | DISK TYPE <br> 2248b |
|---|---|---|---|---|---|---|---|---|
| USP_V.0 | 0 | 0 | - | 0, 1 | PROVIDED | on | 20GB | FC |
| USP_V.0 | 1 | 0 | - | 2, 3 | PROVIDED | sleep | 10GB | FC |
| AMS.0 | 0 | 0 | USP_V.0 | 0 | PROVIDED | on | 5GB | SATA |
| AMS.0 | 1 | 1 | USP_V.0 | 1 | PROVIDED | on | 5GB | SATA |

*FIG. 13*

VOLUME STATUS TABLE 228

| DEVICE ID 2280 | LUN 2281 | CAPACITY 2282 | DISK TYPE 2283 | REGISTRATION DESTINATION RESOURCE ID 2284 | USE STATUS 2285 | POWER SUPPLY STATUS 2286 | PATH FLAG 2287 | FORMAT FLAG 2288 |
|---|---|---|---|---|---|---|---|---|
| USP_V.0 | 0 | 20GB | FC | - | RESERVED | ON | YES | NO |
| USP_V.0 | 1 | 10GB | FC | - | NOT IN USE | SLEEP | NO | YES |
| USP_V.0 | 2 | 5GB | SATA | POOL 0 | IN USE | ON | NO | NO |
| USP_V.0 | 3 | 5GB | SATA | POOL 1 | IN USE | ON | NO | NO |

*FIG. 17*

CONFIGURATION OPTIMIZATION METHOD FOR A STORAGE SYSTEM

CLAIM OF PRIORITY

The present application claims priority from Japanese application P2007-285932 filed on Nov. 2, 2007, the content of which is hereby incorporated by reference into this application.

BACKGROUND OF THE INVENTION

This invention relates to configuration management for a storage system, and more particularly to a configuration optimization method for a storage system.

In recent years, there is a rapid increase in data amount to be handled by a company or an individual. Along with this, a storage system using a technology such as a storage area network (SAN) or a network attached storage (NAS) is widely used. According to the technology, a storage subsystem or a host computer is coupled via a switch or a hub, to thereby manage data with flexibility.

Further, in these days, along with the increase in size and the enhancement in performance of a storage system (hereinafter, also referred to as storage subsystem), power consumption in the storage subsystem is increasing than ever, due to which greater importance is placed on the attainment of low power consumption in the storage subsystem. Also, with the increase in management cost of the storage subsystem, it has also become increasingly important to reduce the management cost of the storage subsystem.

As regards the attainment of low power consumption in the storage subsystem, there is a technology in which, in a case where a host computer using a storage region (hereinafter, referred to as "volume") of the storage subsystem has not accessed the volume for a predetermined time period, the power of a physical disk forming the volume is turned off or set to a power saving state (hereinafter, both of the states are collectively referred to as "sleep state") and when the volume is accessed the sleep state of the physical disk is canceled to recover a normal power state, thereby suppressing power consumption in the storage subsystem.

For example, there is known a technology of performing ON/OFF control of the power of a physical disk which forms a volume provided by the storage subsystem, based on an instruction from a computer coupled to the storage subsystem, as disclosed in, for example, JP 2005-157710 A.

Meanwhile, as regards the cost reduction of the storage subsystem, there is known a technology of allocating a hypothetical volume (hereinafter, referred to as "virtual volume") to a host computer, and allocating an actual storage region according to an I/O made by the host computer with respect to the virtual volume, as disclosed in, for example, JP 2003-15915 A.

In the case of using the above-mentioned technologies, an administrator of the storage system registers at least one volume for a logical group, which is referred to as pool (hereinafter, a volume registered for the pool is referred to as "pool volume"). At this time, the administrator also sets a threshold value, based on which a capacity shortage of the pool is warned. Then, the administrator creates a virtual volume, and associates the virtual volume with the pool volume and the host computer.

When data is written by the host computer to the virtual volume, the written data is actually stored in the pool volume. When an amount actually used in the capacity of the pool volume approaches the threshold value as a result of data writes made to the virtual volume, the management computer notifies a warning to the administrator. In response to the warning, the administrator performs a process of, for example, adding a physical disk to the storage subsystem.

SUMMARY OF THE INVENTION

According to the above-mentioned conventional examples, an I/O from the host computer to a virtual volume is balanced among pool volumes of a pool associated with the virtual volume. Accordingly, once a pool volume is registered for a pool, the pool volume is frequently accessed, which leads to a problem that a power saving effect cannot be attained even when the method according to JP 2005-157710 A is adopted in the case of using the technology according to JP 2003-15915 A. In other words, parallel access is made to the pool volume registered for the pool, which leads to a problem that it is difficult to set the registered pool volume to the sleep state. Further, even when the technology according to JP 2005-157710 A is applied to the pool volume, the sleep state can be set for a short period, leading to a high incidence of spinups in the pool volume, and there occurs a problem, due to the high incidence of spinups, that the power saving effect is reduced and the high incidence of spinups further causes a deterioration in the responsivity of the pool.

The above-mentioned problems always occur, not only in the case of using the technology according to JP 2003-15915 A, but also in a case of using any technology in which storage regions are formed in a group and parallel access is made thereto.

Further, the above-mentioned problems similarly occur in a case of grouping storage regions based on any other criterion than the criterion on power saving, such as a criterion on response performance of the storage region, a criterion on costs, and a criterion on access parallelism.

This invention has been made to solve the above-mentioned problems, and therefore it is an object of this invention to provide, when optimizing a configuration of a storage system using a pool, an optimal configuration while ensuring a policy set by an administrator, the policy concerning a power saving performance, a response performance, or the like.

According to this invention, when an administrator of a computer system registers a storage region (volume) for a storage region pool, the administrator sets a capacity of the pool, a threshold value based on which a shortage in the capacity of the pool is warned, and a configuration policy (criterion). The configuration policy includes information on a condition (criterion on low power consumption, high response performance, or the like) required of the pool.

The management computer sets, according to the policy, priorities (order of priority) to volumes held by the storage system (storage subsystem), and reserves volumes satisfying the capacity of the pool, in descending order of the priority. Only some of the reserved volumes are registered for the pool in descending order of the priority. A method of determining the number of volumes to be registered for the pool may include a method in which the minimum number of volumes capable of satisfying the threshold value of the pool is set as the number of volumes to be registered, but is not specifically limited. At this time, it can be guaranteed that the host computer makes no access to the volumes which have not been registered for the pool, and therefore the sleep state is set to physical disks (drives) forming the volumes or to a controller controlling the physical disks.

The administrator associates a virtual volume (storage region to be allocated to the host computer) to the pool and to the host computer, and the host computer starts using the volume. When an amount actually used in the capacity of the pool has become equal to or larger than the threshold value as a result of data writes made by the host computer to the virtual volume, the storage system notifies a warning, and according to the warning, the management computer adds a volume of higher priority, of the reserved volumes, to the pool. In a case where there is no reserved volume, the management computer notifies a warning to the administrator.

Further, the management computer monitors configuration change in the storage subsystem, and in a case where the configuration has been changed, the management computer searches for a volume which is equivalent, in terms of quality of service (QoS), to the pool volume or the reserved volume. In a case where the corresponding volume is found, the priority of the volume is calculated. In a case where a volume which has a priority lower than the priority of the corresponding volume is used as the pool volume or reserved, the management computer replaces the volume with the corresponding volume. It should be noted that, to replace volumes, data stored in one of at least two volumes or information on the volume is migrated to the other one of the volumes, and the data in the original volume and the information on the original volume is deleted.

Therefore, according to this invention, the management computer is allowed to reserve a storage region according to a set criterion or to replace the storage region, to thereby optimize the configuration of the storage subsystem while ensuring the set criterion.

BRIEF DESCRIPTION OF THE DRAWINGS

FIG. 2 is an explanatory diagram illustrating an example of a volume management table according to the first embodiment.

FIG. 3 is a diagram illustrating an example of a reservation criterion table according to the first embodiment.

FIG. 4 is a diagram illustrating an example of a score table according to the first embodiment.

FIG. 5 is a diagram illustrating an example of a reservation management table according to the first embodiment.

FIG. 13 is an explanatory diagram illustrating an example of a volume management table having external connection information according to the second embodiment.

FIG. 17 is an explanatory diagram illustrating an example of a volume status table according to the third embodiment.

DETAILED DESCRIPTION OF THE PREFERRED EMBODIMENTS

Hereinbelow, embodiments of this invention will be described with reference to the accompanying drawings.

A. First Embodiment

A1. System Configuration

Figure 1:
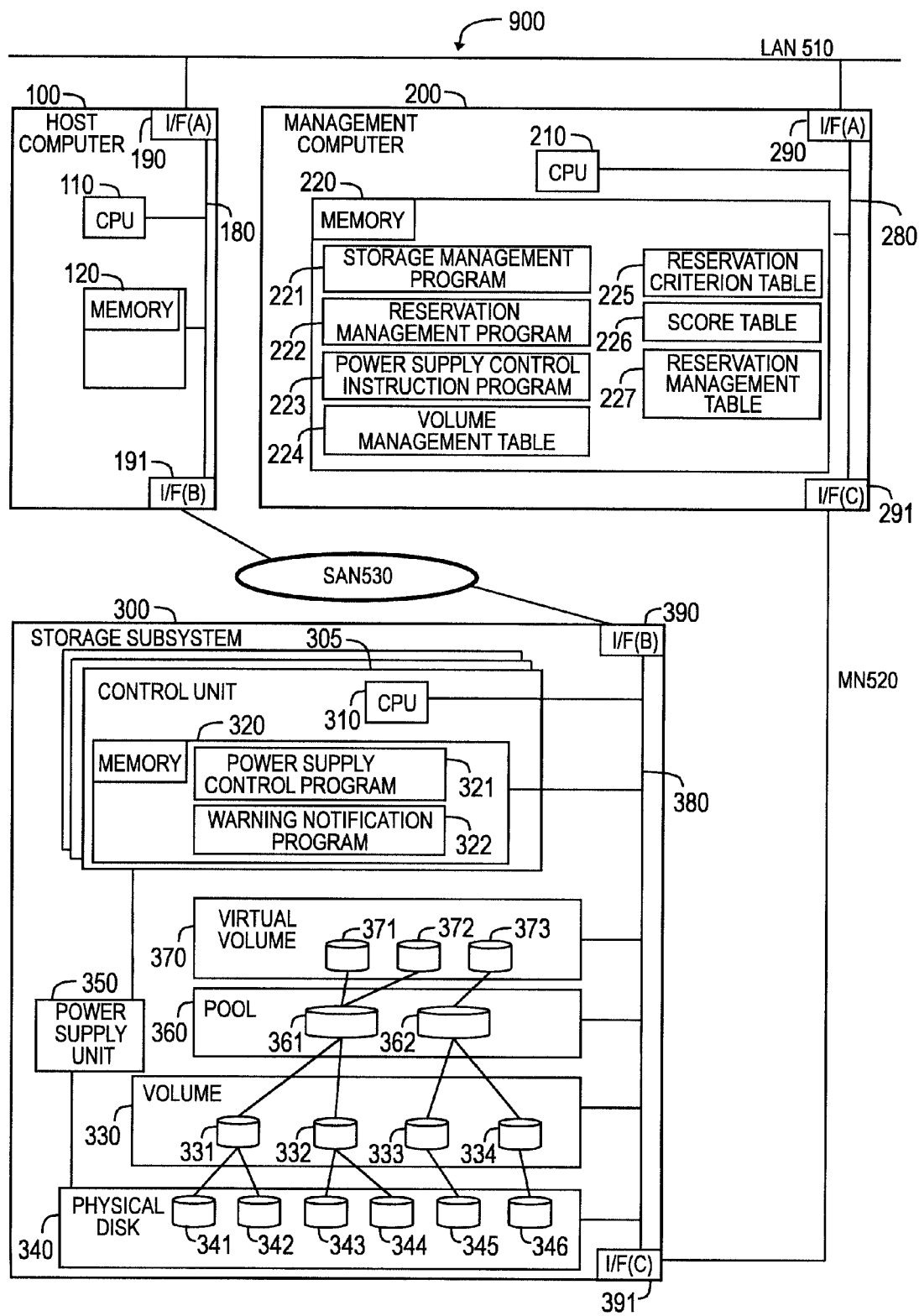
FIG. 1 is a block diagram illustrating a system configuration according to a first embodiment of this invention.

FIG. 1 is a block diagram illustrating a configuration of a data processing system according to a first embodiment of this invention. The data processing system 900 includes at least each one of a host computer 100, a management computer 200, and a storage subsystem 300.

The host computer 100 and the management computer 200 are coupled to each other via a local area network (LAN) 510. The host computer 100 and the storage subsystem 300 are coupled to each other via a storage area network (SAN) 530. The management computer 200 and the storage subsystem 300 are coupled to each other via a management network (MN) 520.

The host computer 100 includes a central processing unit (CPU) (also referred to as processor) 110, a memory 120, a network interface I/F (A) 190 for coupling to the LAN 510, and a network interface I/F (B) 191 for coupling to the SAN 530. Those constituent elements are coupled to one another via a bus 180.

The CPU 110 executes programs loaded into the memory 120 to implement the functions of the host computer 100. The memory 120 stores programs and data to be used by the CPU 110. The memory 120 includes a program for accessing a volume 330 which is provided by the storage subsystem 300. The program may include any program, and therefore is not shown. Also, the storage subsystem 300 provides, as will be described later, the volume 330 formed of a physical disk 340, a pool 360 which includes a logical group of the volumes 330, and a virtual volume 370 which is associated with the volume (pool volume) 330 forming the pool 360.

The host computer 100 further includes, in addition to the above, an input device, through which a user of the host computer 100 inputs data, and an output unit for outputting information to the user of the host computer 100, which are not shown.

The management computer 200 includes a CPU (also referred to as processor) 210, a memory 220, an I/F (A) 290 for coupling to the LAN 510, and an I/F (C) 291 for coupling to the MN 520. Those constituent elements are coupled to one another via a bus 280.

The CPU 210 executes programs loaded into the memory 220 to implement the functions of the management computer 200. The memory 220 stores programs and data to be used by the CPU 210. In particular, the memory 220 has a storage management program 221, a reservation management program 222, a power supply control instruction program 223, a volume management table 224, a reservation criterion table 225, a score table 226, and a reservation management table 227, stored therein.

The storage management program 221 is executed by the CPU 210 for performing a process of managing the storage subsystem 300.

The reservation management program 222 is executed by the CPU 210 for performing a process of reserving the volume 330 held by the storage subsystem 300.

The power supply control instruction program 223 is executed by the CPU 210 for instructing a power supply control program 321, which is stored in the memory 320 of the storage subsystem 300, to set the power supply status of the volume 330 to a sleep state and to cancel the sleep state. In this case, when the volume 330 is set to the sleep state, the physical disk forming the storage subsystem 300 as described above is turned off or turned to a power saving state.

The volume management table 224 includes, as shown in FIG. 2, a device ID 2240 for identifying a storage subsystem 300 providing the volume 330, a logical unit number (LUN) 2241 which includes an identification number of the volume 330 provided by the storage subsystem 300, a control unit ID 2242 for identifying a control unit 305 which controls the volume 330, a disk ID 2243 for identifying at least one physical disk 340 forming the volume 330, a power supply status 2244 of the volume 330, a capacity 2245 of the volume 330, and an interface type 2246 of the physical disk 340 forming the volume 330, and a use status 2247 indicating the use status of the volume 330. It should be noted that the device ID 2240, the LUN 2241, the control unit ID 2242, and the disk ID 2243 are not limited to the expressions in the drawing, and may be represented by any other expression as long as information capable of uniquely identifying each of the storage subsystem 300, the volume 330, the control unit 305, and the physical disk 340, respectively, is included. Similarly, the power supply status 2244, the capacity 2245, and the disk type 2246 are not limited to the expressions in the drawing. Further, the relation between the volume 330 and the physical disk 340 forming the volume is not limited to the relation shown in FIG. 2, as long as one or more of the volumes 330 and one or more of the physical disks 340 are associated with each other. Also, in a case where the use status 2247 is registered as "not in use", the volume 330 is neither used nor reserved, and the use state 2247 indicates, as the status of the volume 330, any one of three statuses where:

the volume is neither used nor reserved;
the volume is reserved; and
the volume is used in (registered for) a pool.

As described above, the volume management table 224 is for managing, for each storage subsystem, configuration information, a power supply status, and a reservation status of a disk, on a volume (LU) unit basis. It should be noted that the storage subsystem 300 may be provided with a plurality of control units, and a number of volumes can be managed by different control units.

The reservation management table 225 includes, as shown in FIG. 3, a unit ID 2250 for identifying a storage subsystem 300, a resource ID 2251 for identifying a resource to which the reservation criterion is applied, a capacity 2252 of a pool 360 that has been set as the resource to which the reservation criterion is applied, a threshold value 2253 for warning the shortage of the pool capacity, and a reservation criterion 2254. It should be noted, however, that the unit ID 2250 is not limited to the expression in the drawing, and may be represented by any other expression as long as information capable of uniquely identifying the storage subsystem 300 is included. The resource ID 2251 includes information for identifying a pool 360 in this embodiment, but the identification target is not limited to the pool 360. The resource ID 2251 may include any other information for identifying a resource which is formed of a group of the volumes 330. Also, the capacity 2252 and the threshold value 2253 are not limited to the expressions in the drawing. The reservation criterion 2254 includes, as the reservation criteria, items including a power saving, response performance, low cost, an access balancing degree in a pool volume, which are each expressed by a numeric value up to 10, but the number of items is not limited to those four items. Further, each of the items is not necessarily expressed by a numeric value up to 10. Based on the above-mentioned reservation criterion table 225, volumes (pool volumes) to be added to a pool, which will be described later, are managed. It should be noted that, the item of power saving, which is one of the items included as the reservation criterion 2254, for example, indicates lower power consumption in a sleep state as the numeric value set in the item increases. Also, the item of response performance indicates a higher response speed (reduced waiting time) as the numeric value set in the item increases, the item of low cost indicates a lower procurement cost as the numeric value set in the item increases, and the item of access balancing degree indicates a higher parallelism in access as the numeric value set in the item increases. Each of the items may have any numeric value from 0 to 1 set thereto, and a total of the numeric values set to the four items is limited to 10. Each of those numeric values can be expressed as a relative value in the storage subsystem 300.

The score table 226 includes, as shown in FIG. 4, a unit ID 2260 for identifying the storage subsystem 300, a logical unit number (LUN) 2261 which includes an identification number of the volume 330, and the score 2262 of the volume 330. However, the unit ID 2260 and the LUN 2261 are not limited to the expressions in the drawing, and may be represented by any other expression as long as information capable of uniquely identifying each of the storage subsystem 300 and the volume 330, respectively, is included. Also, the score 2262 in this embodiment holds a numeric value (score) regarding each of the power saving, the response performance, the low cost, and the access balancing degree in a pool volume, which correspond to the items included in the reservation criterion 2254 of the reservation criterion table shown 225 shown in FIG. 3, but is not limited thereto. The score 2262 corresponds to a value for indicating a degree of suitability of each volume (LU) 330 held by the storage subsystem 300, in terms of each of the items of the reservation criterion 2254 of the reservation criterion table 225.

The reservation management table 227 includes, as shown in FIG. 5, a resource ID 2270 for identifying a reservation destination resource, an order of priority 2271 of the volume 330, a unit ID 2272 for identifying the storage subsystem 300, and a logical unit number (LUN) 2273 which includes an identification number of the volume 330. It should be noted that the resource ID 2270 in this embodiment includes information for identifying the pool 360, but the identification target is not limited to the pool 360. The resource ID 2270 may include any other information for identifying a resource which is formed of a group of the volumes 330. The unit ID 2272 and the LUN 2273 are not limited to the expressions in the drawing, and may be represented by any other expression as long as information capable of identifying each of the storage subsystem 300 and the volume 330, respectively, is included. Referring to FIG. 5, volumes having LUNs=0 to 3 of the unit ID=USP_V.0 are reserved. In this case, the use state 2247 corresponding to each of the LUNs=0 to 3 in the volume management table 224 of FIG. 2 has "YES" set thereto. As described above, the reservation management table 227 manages an order of priority (priority) of reservation for each volume of the pool indicated by the resource ID 2270.

The management computer 200 further includes, in addition to the above, an input unit, through which a user of the management computer 200 inputs data, and an output unit for outputting information to the user of the management computer 200, which are not shown.

The storage subsystem 300 includes the control unit 305, the volume 330, the physical disk 340, a power supply unit 350, the pool 360, the virtual volume 370, an I/F (B) 390 for coupling to the SAN 530, and an I/F (C) 391 for coupling to the MN 520. The volume 330 in this case corresponds to a logical storage region formed of a physical resource provided by at least one physical disk 340. FIG. 1 shows, by way of example, four volumes 330 (volumes 331, 332, 333, and 334) and six physical disks 340 (physical disks 341, 342, 343, 344, 345, and 346), but the numbers thereof are not limited thereto as long as at least each one of the volume 330 and the physical disk 340 are provided. FIG. 1 also shows, by way of example, the volume 331 including the physical disks 341 and 342, the volume 332 including the physical disks 343 and 344, the volume 333 including the physical disk 345, and the volume 334 including the physical disk 346, but this invention is not limited thereto, as long as the volume 330 and the physical disk 340 are associated at least one-to-one with each other.

The pool 360 corresponds to a logical group which includes at least one volume 330. In FIG. 1, two pools 360 (a pool 361 and a pool 362) are provided, but this invention is not limited thereto, as long as at least one pool 360 is provided. Also, in FIG. 1, the pool 361 includes the volumes 331 and 332, and the pool 362 includes the volumes 333 and 334, but this invention is not limited thereto, as long as the pool 360 and the volume 330 are associated at least one-to-one with each other.

The virtual volume 370 corresponds to a virtual storage region. The virtual volume 370 is allocated to the host computer 100, and receives data write access and data read access from the host computer 100. It should be noted that the virtual volume 370 does not include an actual storage region, and the data write access made by the host computer 100 with respect to the virtual volume 370 is transmitted, through the pool 360 associated with the virtual volume 370, to the volume 330 forming the pool 360, and the data written by the host computer 100 is stored in the volume 330. Similarly, the data read access made by the host computer 100 with respect to the virtual volume 370 is also transmitted, through the pool 360 associated with the virtual volume 370, to the volume 330 forming the pool 360, and the data to be read by the host computer 100 is read out from the volume 330. FIG. 1 shows, by way of example, three virtual volumes 370 (virtual volumes 371, 372, and 373), but this invention is not limited thereto, as long as at least one virtual volume 370 is provided. Also, in the drawing, the virtual volumes 371 and 372 are associated with the pool 361, and the virtual volume 373 is associated with the pool 362, but this invention is not limited thereto, as long as the virtual volume 370 and the pool 361 are associated at least one-to-one with each other.

The control unit 305 includes a CPU 310 and a memory 320. Those constituent elements are coupled to each other via a bus 380. The memory 320 stores programs and data to be used by the CPU 310. In particular, the memory 320 includes a power supply control program 321 and a warning notification program 322.

The power supply control program 321 is executed by the CPU 310 for controlling the power supply unit 350, the physical disk 340, and the control unit 305, to thereby control an amount of power to be supplied to the physical disk 340 or to the control unit 305. However, the targets of the power supply amount control by the power supply control program 321 are not limited to the physical disk 340 and the control unit 305.

The warning notification program 322 is executed by the CPU 310, for notifying the management computer 200 of a warning when an amount actually used in the capacity of the pool 360 is approaching the threshold value 2253 (or has reached to exceed the threshold value 2253) of the pool 360. A method of determining a timing as to when to notify the warning as the amount actually used in the capacity of the pool is approaching the threshold value of the pool 360 may include a method of setting the timing as a fixed value in advance, or a method in which the management computer 200 sets the timing when creating the pool 360 on the subsystem 300, but is not specifically limited. Also, in this embodiment, the threshold value 2253 includes a value to be compared with the amount actually used in the capacity of the pool 360, but may include a value to be compared with an amount not in use in the pool 360. When the value is compared with the amount not in use, the magnitude relation in comparison made in Step S 104 (to be described later) of FIG. 6 may be reversed. The control unit 305 obtains the threshold value 2253 from the management computer 200 at a predetermined timing, and monitors the capacity of the volume 330 of the storage subsystem 300.

The storage subsystem 300 further includes, in addition to the above, an input device, through which a user of the storage subsystem 300 inputs data, and an output device for outputting information to the user of the storage subsystem 300, which are not shown.

A2. Description of Data Processing Procedure

Figure 6:
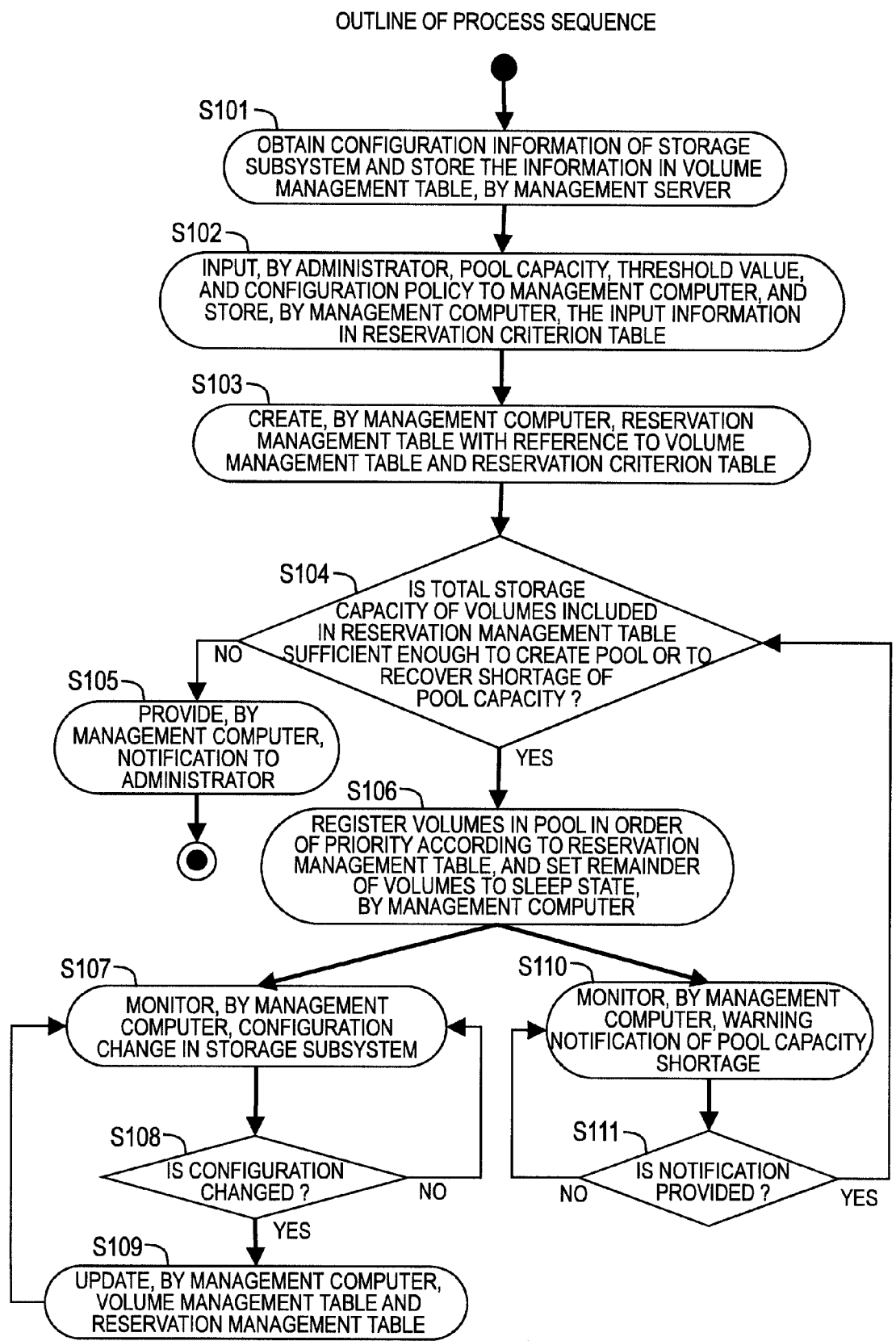
FIG. 6 is a flowchart for illustrating an outline of a process performed by a management computer according to the first embodiment.

FIG. 6 shows an outline of a process performed by the management computer 200. In FIG. 6, first in Step S101, the storage management program 221 on the management computer 200 obtains configuration information of the storage subsystem 300, and stores the information on the volume 300 in the volume management table 224 shown in FIG. 2.

In Step S102, a storage administrator inputs, through the reservation management program 222 on the management computer 200, a capacity of the pool 360, the threshold value 2253 for warning a shortage of the pool capacity, and a configuration policy (reservation criterion 2254) of the pool 360, and the management computer 200 stores those values in the reservation criterion table 225. According to this embodiment, the pool capacity is input as a value in units of GB, the threshold value 2253 is input as a value in units of %, and the configuration policy of the pool 360 is input as values regarding four viewpoints (items) of the power saving, the response performance, the low cost, and the access balancing degree, which are varied for rating the importance to be attached to each of the items and add up to 10, but this invention is not specifically limited thereto.

In Step S103, the reservation management program 222 on the management computer 200 creates the reservation management table 227 with reference to the volume management table 224 and the reservation criterion table 225. Process sequences for creating the reservation management table 227 are shown in FIGS. 7, 8, 9, 10, and 11. Those process sequences will be described later in detail.

In Step S104, the reservation management program 222 on the management computer 224 refers to the reservation criterion table 225 and the reservation management table 227, and determines whether the total capacity of volumes held by the reservation management table 227 exceeds a value obtained from the following expression.

$$(Capacity\ 2252) \times \{100 - (threshold\ value\ 2253)\}/100$$

In Step S104, the management computer 200 determines, upon creating the pool 360 or receiving a warning of capacity shortage from the storage subsystem 300, whether volumes capable of satisfying the necessary capacity are reserved.

For example, in a case where the threshold value 2253=70% is set to the pool 360 of 100 GB, a warning of capacity shortage is issued by the storage subsystem 300 to the management computer 200 when the amount actually used in the capacity of the pool 360 has exceeded 70 GB At this time, the management computer 200 tries to automatically add a volume 330 which is capable of satisfying 100 GB−(100−70)/100=30 GB, to the pool 360. In order to add the volume 330, it is determined in Step S104 whether the volume 330 reserved by the management computer 200 (the volume registered in the reservation management table 225) has an enough capacity to satisfy 30 GB. In the above-mentioned example, the shortfall of the capacity, which is 30 GB, is covered at once, but this invention is not limited thereto, and the volume 330 may be added in a plurality of batches to make up the shortfall.

The total capacity of the volumes included in the reservation management table 227 corresponds to a value input by the storage administrator to the management computer 200, and is notified at the same time when the management computer 200 issues a command to the storage subsystem 300 to create the pool 360 or the volume 330.

The amount actually used in the capacity of the pool 360 or of the volume 330 may be calculated as follows.
The amount actually used in the capacity of the volume 330:
  the sum total of data amounts or parity data amounts written into the physical disk 340 forming the volume 330. The data amount written into the physical disk 340 may be calculated by a known method.
The amount actually used in the capacity of the pool 360: the sum total of the actual amounts used in volumes 330 forming the pool 360

The storage subsystem 300 obtains, as described above, the amount actually used in the capacity of the pool 360 or in the volume 330, and notifies the amount to the management computer 200.

In the case where it has been determined in Step S104 that the total capacity of the volume 330 included in the reservation management table 227 falls below the value calculated from (Capacity 2252)×{100−(threshold value 2253)}/100, the warning notification program 322 of the storage subsystem 300 notifies a warning, in Step S105, to the storage administrator through the reservation management program 222 on the management computer 200. Upon receiving the warning through an output device such as a display, the administrator performs an operation to newly add a physical disk 340 to the storage subsystem 300, to thereby prevent a shortage of the storage region of the pool 360 from being caused.

In the case where it has been determined in Step S104 that the total capacity of the volume 330 of each pool 360 does not fall short of the value calculated from (Capacity 2252)×{100−(threshold value 2253)}/100, the reservation management program 222 on the management computer 200 refers to, in Step 106, the order of priority 2271 in the reservation management table 227 and registers the volumes 330 in descending order of the priority, for the pool 360. A method of determining the number of volumes to be registered for the pool 360 may include a method in which the minimum number of volumes capable of satisfying the threshold value 2253 of the pool 360 is set as the number of volumes to be registered, but is not specifically limited. It should be noted that, according to this embodiment, the warning notification program 322 notifies a warning to the management computer 200 when the amount actually used in the capacity of the pool 360 becomes equal to or more than the threshold value 2253, the capacity of the volume 330 to be registered in (allocated to) the pool 360 is set to be larger than the threshold value 2253 by a predetermined amount. For example, a value (second threshold value) obtained by adding 10% to the threshold value 2253 is set as the capacity of the volume 330 to be registered at the time of creating the pool 360.

Also, to obtain the total amount used in the capacity of the volume 330 included in the reservation management table 227, the management computer 200 inquires the storage subsystem 300 about the amount actually used in the capacity of each volume 330. For example, the storage management program 221 of the management computer 200 monitors remaining capacity of each volume 330 of the storage subsystem 300 at predetermined intervals, to thereby obtain the amount used in the capacity of the pool 360.

Further, the power supply control instruction program 223 on the management computer 200 instructs the power supply control program 321 on the storage subsystem 300 to set the volumes 330 that have not been registered for the pool 360, to the sleep state. The power supply control program 321 sets the physical disk 340 forming the volume 330 designated by the power supply control instruction program 223 or the power status of the control unit 305 controlling the volume 330, to the sleep state. Further, in Step S106, threads (or tasks) of Steps S107 and S110 are activated to execute the following processes in parallel with one another.

In Step S107, the storage management program 221 on the management computer 200 monitors configuration change in the storage subsystem 300. The configuration change refers to, for example, a case where the physical disk 340 is replaced or added, or a case where the use status of a volume that has been "in use" is changed to "not in use".

In Step S108, the storage management program 221 on the management computer 200 judges whether any change has occurred in the configuration of the storage subsystem 300, and in the case where the configuration has been changed, the process proceeds to Step S109. In the case where the configuration remains unchanged, the process proceeds to Step S107.

In Step S109, the storage management program 221 on the management computer 200 obtains configuration information on the storage subsystem 300 after the change, and updates the volume management table 224. Also, the reservation management program 222 updates the reservation management table 227, based on the updated volume management table 224 and the reservation criterion table 225. When the process of Step S109 is completed, the process returns again to the process of Step S107 to repeat the above-mentioned process.

In the process of Step S110, which is executed independently of the processes in Steps S107 to S109, the storage management program 221 on the management computer 200 monitors warning notification from the warning notification program 322 on the storage subsystem 300. The warning notification program 322 notifies a warning at a timing, for example, when the host computer 100 has written data in the virtual volume 370 and a storage region of the volume 330 forming the pool 360 has been mapped to the virtual volume 370 with the result that the amount actually used in the capacity of the pool 360 has exceeded the threshold value 2253 of the pool 360, but the timing is not specifically limited.

In other words, the management computer 200 monitors warning notification to be provided by the storage subsystem 300 for notifying shortage in the pool capacity, and the storage subsystem 300 compares the amount actually used in the capacity of the pool with the threshold value. In the case where the amount actually used in the capacity has exceeded the threshold value, the storage subsystem 300 notifies the warning to the management computer 200.

Lastly, in Step S111, the storage management program 221 on the management computer 200 judges whether there has been a warning notification provided by the warning notification program 322 on the storage subsystem 300, and in the case where the warning notification has been provided, the process proceeds to Step S104. In the case where no warning notification has been provided, the process returns to the Step S110 to repeat the above-mentioned process.

Through the above-mentioned processes, the storage subsystem 300 transmits a warning to the management computer 200 when the total amount used in the capacity of the pool 360 becomes equal to or more than the predetermined threshold value 2253. Further, of the reserved volumes, the volumes 330 which have not been registered for the pool 360 are set to the sleep state, to thereby suppress power consumption in the storage subsystem 300.

FIGS. 7 to 11 each show a process sequence followed by the reservation management program 222 on the management computer 200 in Step S103 of FIG. 6 to create the reservation management table 227 based on the volume management table 224 and the reservation criterion table 225.

The reservation management program 222 on the management computer 200 first refers to the volume management table 224, and creates the score table 226 through the process sequences of FIGS. 7 to 10. The processes shown in FIGS. 7 to 10 may be executed sequentially or in parallel with one another by the management computer 200.

Through the process sequences of FIGS. 7 to 10, there is calculated a degree of suitability (score) of each volume 330 held by the storage subsystem 300, in terms of each of the viewpoints (items) of the reservation criterion 2254 input by a storage administrator to the reservation management program 222.

Figure 7:
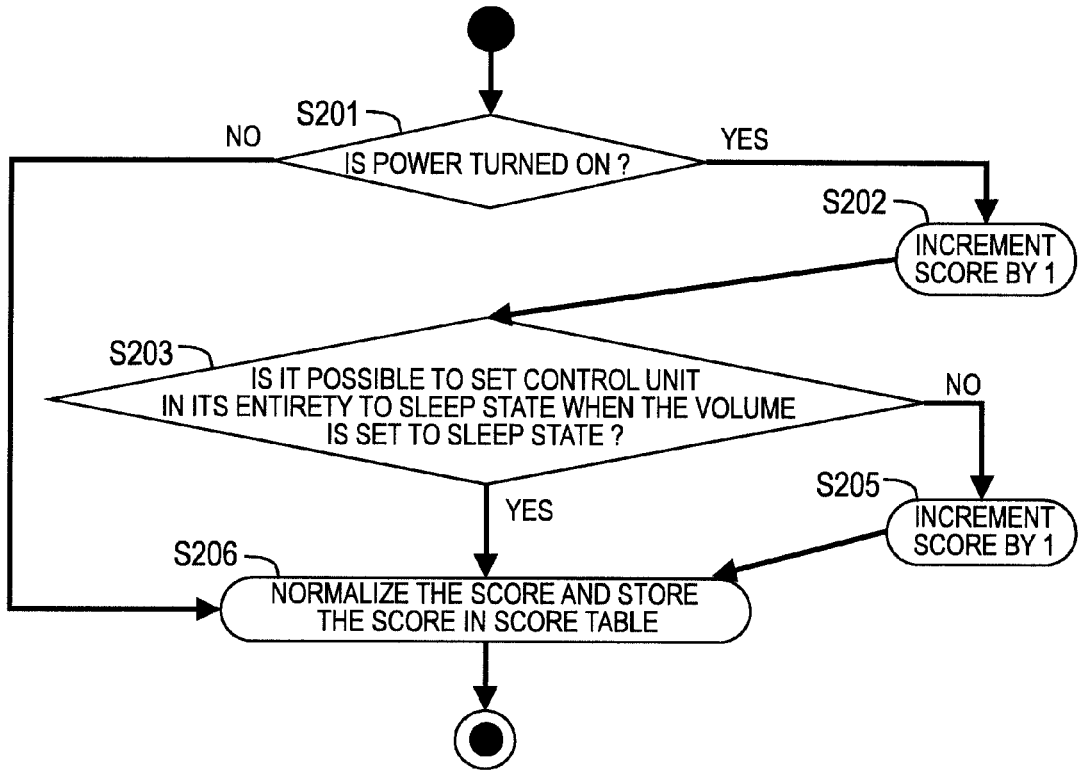
FIG. 7 is a flowchart for illustrating an example of an evaluation to be made from the viewpoint of power saving, which is executed when a reservation management program creates the score table according to the first embodiment.

FIG. 7 shows a process sequence for making an evaluation from the viewpoint of power saving. In the process sequence of FIG. 7, calculation is performed so as to give a higher score to a volume 330 that is less suitable for power saving. The reason for this is to minimize a chance to use a volume 330 that is suitable for power saving (for example, a volume which is already in the sleep state) as the pool volume.

In FIG. 7, first in Step S201, the reservation management program 222 refers to the power supply status 2244 of the volume management table 224, and judges, on each volume 330, whether the power supply status of the volume 330 is ON or not. In the case where the power supply status of the volume 330 is ON, the score of the volume 330 is incremented by 1 in Step S202. In this case, the score of each volume 330 has a default value set to 0. In the case where the power supply status of the volume 330 is not ON, the process proceeds to Step S206.

Next, in Step S203, the reservation management program 222 refers to the control unit ID 2242 and the power supply status 2244 of the volume management table 224, and judges, on each volume 330, whether it is possible to set the power supply status of the control unit 305 controlling the volume 330 to the sleep state when the power supply status of the volume 330 is set to the sleep state. It should be noted that, in this case, when the power supply statuses of the volumes 330 controlled by one control unit 305 are all set to the sleep state, the control unit 305 can be set to the sleep state. In the case where the power supply status of the control unit 305 can be set to the sleep state, the process proceeds to Step S206. In the case where the power supply status of the control unit 305 cannot be set to the sleep state, the score of the volume 330 is incremented by 1 in Step S205.

Lastly, in Step S206, the reservation management program 222 normalizes the score of each volume 330, and stores the score in the item of power saving included in the score 2262 of the score table 226.

Through the above-mentioned processes, the score of the volume 330 in the sleep state is not incremented, while the score of the volume 330 which is turned ON is incremented, so as not to add the volume 330 in the sleep state to the pool, to thereby keep the sleep state thereof. Further, in the case where all the volumes 330 coupled to the control unit 305 are in the sleep state, the control unit 305 itself can be put into the sleep state, to thereby further suppress power consumption in the storage subsystem 300.

Figure 8:
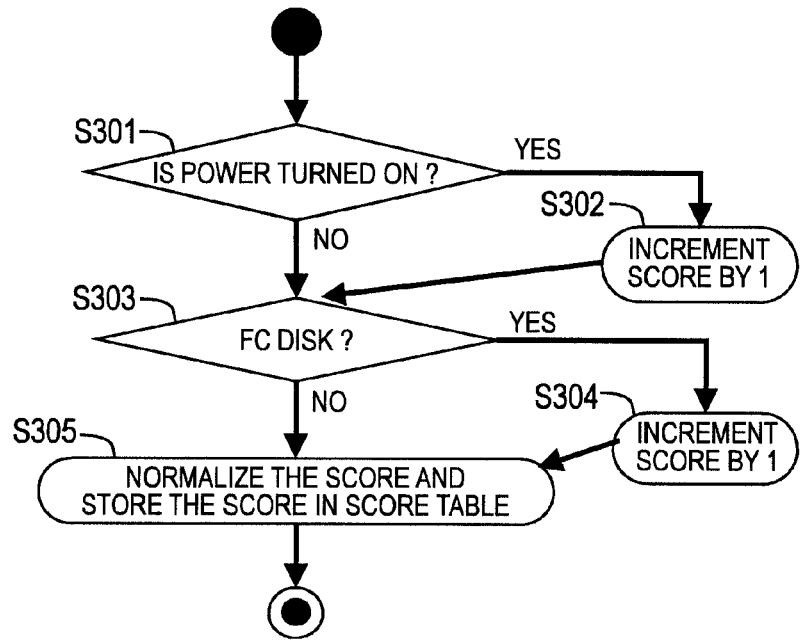
FIG. 8 is a flowchart for illustrating an example of an evaluation to be made from the viewpoint of response performance, which is executed when the reservation management program creates the score table according to the first embodiment.

FIG. 8 shows a process sequence for making an evaluation from the viewpoint of response performance. In the process sequence of FIG. 8, calculation is performed so as to give a higher score to a volume which outperforms in terms of response performance. The reason for this is to maximize a chance to use a volume 330 that is suitable in view of response performance as the pool volume.

In FIG. 8, first in Step S301, the reservation management program 222 refers to the power supply status 2244 of the volume management table 224 and judges, on each volume 330, whether the power supply status of the volume 330 is ON or not. In the case where the power supply status of the volume 330 is ON, the score of the volume 330 is incremented by 1 in Step S302. In this case, the score of each volume 330 has a default value set to 0. In the case where the power supply status of the volume 330 is not ON, the process proceeds to Step S303.

Next, in Step S303, the reservation management program 222 refers to the disk type 2246 of the volume management table 224, and judges, on each volume 330, whether the disk type thereof is fibre channel (FC) disk or not. In this case, the disk type 2246 may include FC disk or serial advanced technology attachment (SATA) disk, but is not limited. In the case where the disk type is FC disk, the score of the volume 330 is incremented by 1 in Step S304. In the case where the disk type is not FC disk, the process proceeds to Step S305.

Lastly, in Step S305, the reservation management program 222 normalizes the score of each volume 330, and stores the score in the item of response performance included in the score 2262 of the score table 226.

Through the above-mentioned processes, a higher score is set to the volume 330 which has adopted FC as an interface of the physical disk 340 because the volume 330 is higher in response speed and transfer speed as compared with a volume 330 adopting SATA, to thereby positively add the volume 330 with FC as the pool volume.

Figure 9:
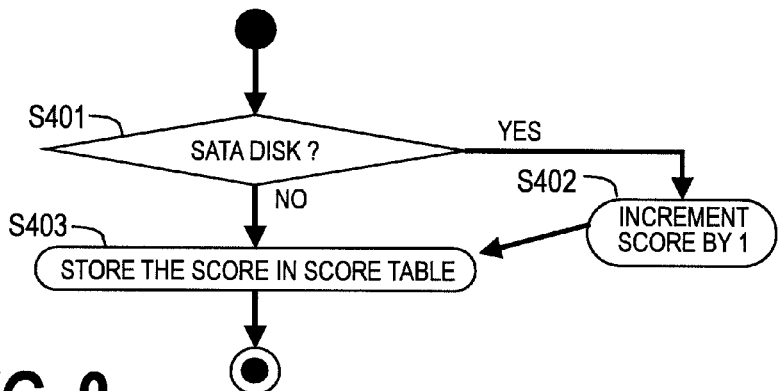
FIG. 9 is a flowchart for illustrating an example of an evaluation to be made from the viewpoint of cost, which is executed when the reservation management program creates the score table according to the first embodiment.

FIG. 9 shows a process sequence for making an evaluation from the viewpoint of cost. In the process sequence of FIG. 9, calculation is performed so as to give a higher score to a volume which is lower in cost. The reason for this is to maximize a chance to use a volume 330 that is low in cost as the pool volume.

In FIG. 9, first in Step S401, the reservation management program 222 refers to the disk type 2246 of the volume management table 224, and judges, on each volume 330, whether the disk type thereof is SATA disk or not. In this case, the disk type 2246 may include FC disk or SATA disk, but is not limited. In the case where the disk type is SATA disk, the score of the volume 330 is incremented by 1 in Step S402. In the case where the disk type is not SATA disk, the process proceeds to Step S403.

Lastly, in Step S403, the reservation management program 222 normalizes the score of each volume 330, and stores the score in the item of low cost included in the score 2262 of the score table 226.

Through the above-mentioned processes, a higher score is set, in view of suppressing cost, to the volume 330 which has adopted SATA as an interface of the physical disk 340 because the volume 330 is lower in cost as compared with a volume 330 adopting FC, to thereby positively add the volume 330 with SATA as the pool volume.

Figure 10:
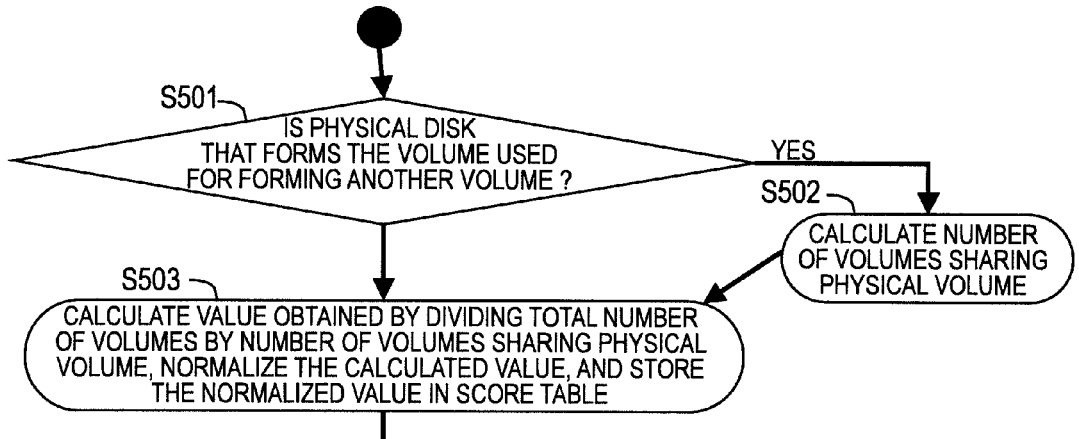
FIG. 10 is a flowchart for illustrating an example of an evaluation to be made from the viewpoint of access balancing degree, which is executed when the reservation management program creates the score table according to the first embodiment.

FIG. 10 shows a process sequence for making an evaluation from the viewpoint of access balancing degree. In the process sequence of FIG. 10, calculation is performed so as to give a higher score to a volume which is smaller in capacity. The reason for this is to maximize a chance to use a volume 330 that is small in capacity as the pool volume, which provides a plurality of volumes 330 to the pool to increase the access balancing degree (parallelism), to thereby increase the access speed.

In FIG. 10, first in Step S501, the reservation management program 222 refers to the disk ID 2243 of the volume management table 224, and judges, on each volume 330, whether the physical disk 340 forming the volume 330 is also used as the physical disk 340 forming another volume 330. In the case where the physical disk 340 forming the volume 330 is used as the physical disk 340 forming the other volume 330, the number of volumes 330 shared by the same physical disk 340 is calculated by the physical disk 340 in Step S502. In the case where the physical disk 340 forming the volume 330 is not used as the physical disk 340 forming the other volume 330, the process proceeds to Step S503.

Lastly, in Step S503, the reservation management program 222 calculates, for each volume 330, a value obtained by dividing the total number of volumes managed by the control unit 305, by the value obtained in Step S502.

Further, the reservation management program 222 normalizes the score, and stores the score in the item of access balancing degree included in the score 2262 of the score table 226.

Through the above-mentioned processes, a higher score is set for the access balancing degree, as the number of volumes 330 sharing the same physical disk 340 increases.

Figure 11:
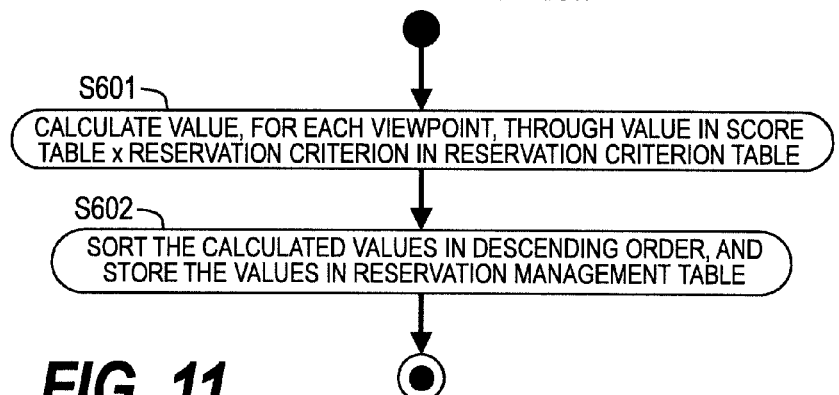
FIG. 11 is a flowchart for illustrating an example of a process sequence followed by the reservation management program to create the reservation management table.

FIG. 11 shows a process sequence followed by the reservation management program 222 to create the reservation management table 227 with reference to the reservation criterion table 225 and the score table 226.

In FIG. 11, first in Step S601, the reservation management program 222 refers to the reservation criterion table 225 and the score table 226, and calculates, for each of the viewpoints in the reservation criterion 2254, the sum of the value obtained by multiplying the value in the reservation criterion 2254 with the value in the score 2262.

Lastly, in Step S602, the reservation management program 222 sorts the device IDs and the LUNs of the volumes 330 in descending order of the values calculated in Step S601, and store the sorted values in the reservation management table 227.

For example, in the case where the reservation criterion 2254 of the pool 1 in the reservation criterion table 225 is multiplied with the score table 226, the following results are obtained.

LUN0=power saving 8×1/2+response performance 0×1+low cost 2×0+balancing degree 0×1/20=4

LUN1=power saving 8×0+response performance 0×1/2+low cost 2×0+balancing degree 0×2/20=0

LUN2=power saving 8×1/2+response performance 0×1/2+low cost 2×1+balancing degree 0×4/20=6

LUN3=power saving 8×1/2+response performance 0×1/2+low cost 2×1+balancing degree 0×4/20=6

The values thus obtained are sorted in descending order, and then LUNs are sorted in ascending order of the numbers of the LUN 2261, whereby LUNs 2, 3, 0, 1 are arranged in the stated order.

The above-mentioned calculation is performed for each pool 360, and in the case of the pool 2, the following results are obtained.

LUN0=power saving 0×1/2+response performance 6×1+low cost 0×0+balancing degree 4×1/20=31/5

LUN1=power saving 0×0+response performance 6×1/2+low cost 0×0+balancing degree 4×2/20=17/5

LUN2=power saving 0×1/2+response performance 6×1/2+low cost 0×1+balancing degree 4×4/20=19/5

LUN3=power saving 0×1/2+response performance 6×1/2+low cost 0×1+balancing degree 4×4/20=19/5

The reservation management program 222 determines the order of priority 2271 of the reservation management table 227 according to the above-mentioned results, and stores the priorities in the reservation management table 227 for the respective resource IDs 2270. In the case where the sums of the values obtained through the multiplication for each volume 330 obtained in Step S601 are equal to each other, the order of priority 2271 is assigned the same value.

Then, the management computer 200 selects, from the volumes 330 reserved for the pool 360, volumes 330 capable of satisfying a capacity corresponding to the threshold value 2253 of the reservation criterion table 225 in ascending order of priority in the reservation management table 227, and registers the volumes 330 thus selected, for the pool 360. The management computer 200 instructs the storage subsystem 300 to set the volumes 330 which have not been registered for the pool 360, of the reserved volumes 330, to the sleep state.

Figure 20:
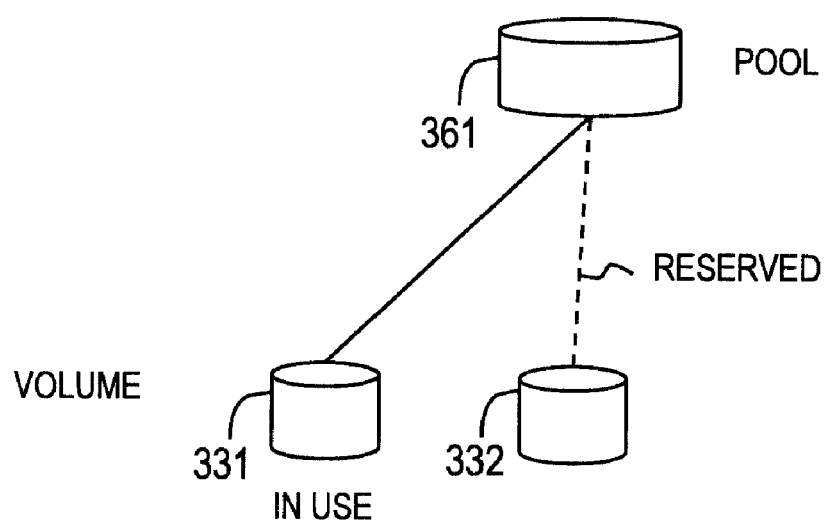
FIG. 20 is an explanatory diagram illustrating a relation between a volume reservation and a volume registration according to the first embodiment.

For example, a case where the pool 361 includes, as shown in FIG. 20, two volumes 331 and 332 will be described. The reservation management program 222 of the management computer 200 sets the order of priority 2271 for the volumes 331 and 332, based on the reservation criterion 2254 of the reservation criterion table 225, and assigns a higher priority for the volume 331. Next, the reservation management program 222 of the management computer 200 selects volumes satisfying the threshold value 2253 of the reservation criterion table 225 according to the order of priority 2271 of the reservation management table 227, and registers the selected volumes for the pool 361. As described above, in this embodiment, the warning notification program 322 notifies a warning when the amount actually used in the capacity of the pool 361 becomes equal to or more than the threshold value 2253, and therefore the volumes to be registered for the pool 361 are selected from the reservation management table 227, such that the capacities of the volumes satisfy a value obtained by adding a predetermined value (for example, 10%) to the threshold value 2253, that is, 80% or more of the capacity of the pool 361. In the case shown in FIG. 20, the volume 331 satisfies a value obtained by adding a predetermined value to the threshold value 2253 of the pool 361, and therefore the volume 331 is registered for the pool 361 and put to use. On the other hand, the volume 332 which is stored in the reservation management table 227 but has not been registered for the pool 361 is set to the sleep state to suppress power consumption.

Figure 21:
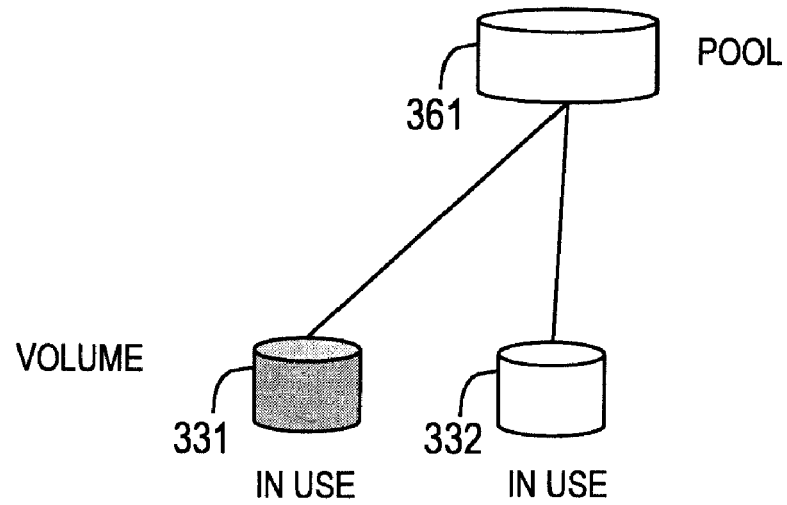
FIG. 21 is an explanatory diagram illustrating a case where a volume that has been reserved is registered according to the first embodiment.

Next, as shown in FIG. 21, when the amount actually used in the capacity of the pool 361 becomes equal to or more than the threshold value 2253 due to continuous use of the pool 361, the warning notification program 332 of the storage subsystem 300 notifies a warning to the management computer 200, and registers the reserved volume 332 for the pool 361 and puts the volume 332 to use. At this time, because the volume 332 has been in the sleep state, the power supply control instruction program 223 of the management computer 200 instructs the power supply control program 321 of the storage subsystem 300 to cancel the sleep state of the volume 332. After the sleep state of the volume 332 is canceled, the management computer 200 registers the volume 332 for the pool 361 and puts the volume 332 to use.

As described above, an administrator sets, in the reservation criterion table 225, a policy (the reservation criterion 2254) for each pool 360, so as to enable the management computer 200 to automatically reserve volumes 330 and to register the volumes 330 for the pool 360 in order of priority, to thereby optimize the configuration of the pool 360 in which the volumes 330 satisfying the set policy (reservation criterion) for each pool 360 is used as the pool volumes. In particular, in view of power saving, the volumes 330 which is not suitable for power saving are positively registered for the pool 360 to be put to use, so as to set the power supply status of the volumes which are suitable for power saving to the sleep state, to thereby suppress power consumption of the storage subsystem 300.

Also, when the amount actually used in the capacity of the pool 360 is equal to or more than the threshold value 2253 and the warning notification program 322 of the storage subsystem 300 notifies a warning to the management computer 200, in the case where the volumes 330 reserved by the reservation management program 222 of the management computer 200 are lacking in capacity, the reservation management program 222 functions as a second warning notification unit for notifying the administrator of a second warning of the capacity shortage of the reserved volumes 330.

B. Second Embodiment

B1. System Configuration

Figure 12:
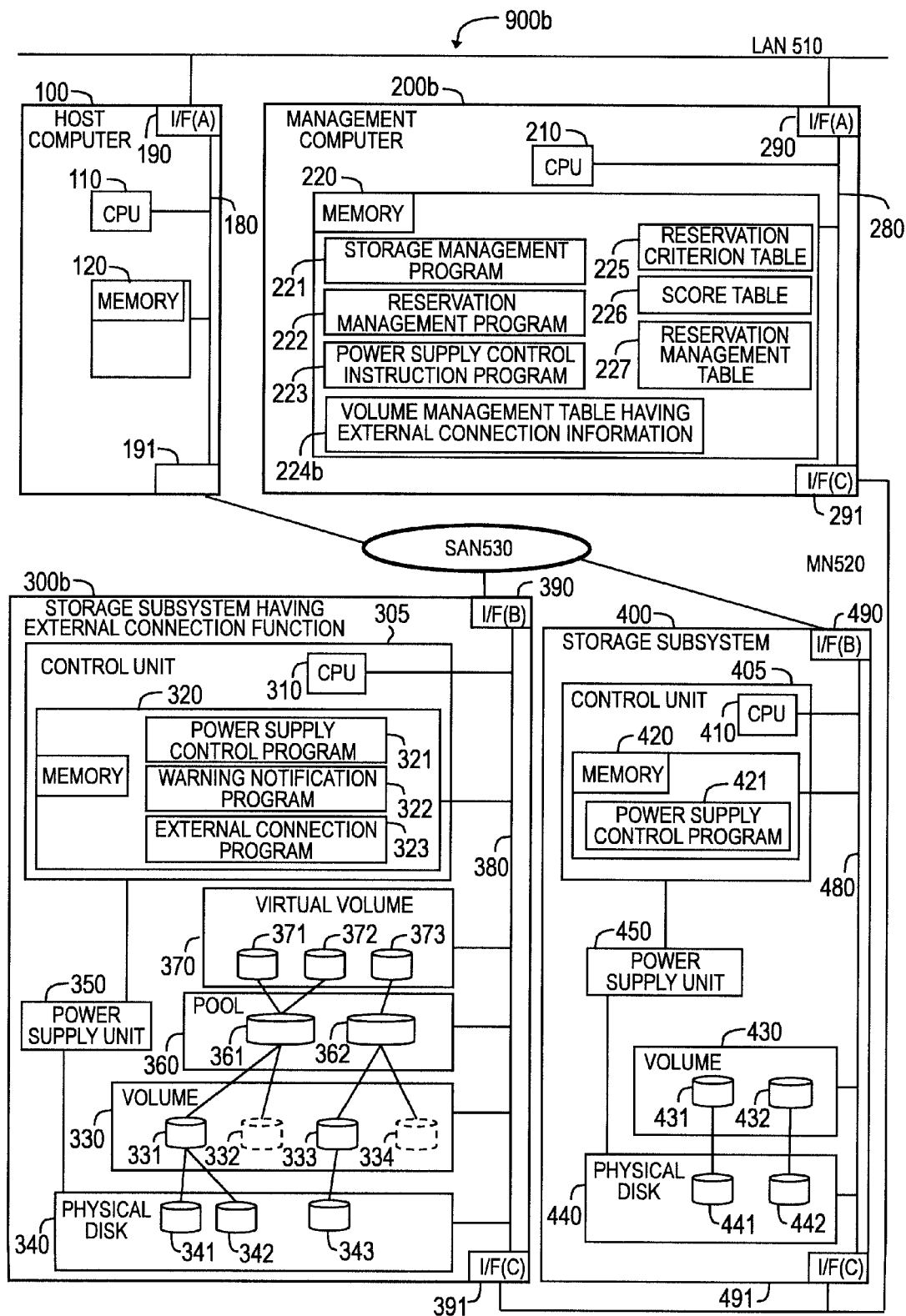
FIG. 12 is a block diagram illustrating a system configuration according to a second embodiment of this invention.

FIG. 12 is an explanatory diagram illustrating a configuration of a data processing system 900b according to a second embodiment of this invention. The data processing system 900b includes at least each one of the host computer 100, a management computer 200b, a storage subsystem 300b, and a storage subsystem 400. The configuration of the second embodiment is similar in most part to the configuration of the first embodiment, and therefore only the difference in configuration will be described hereinafter.

The differences between the data processing system 900 of the first embodiment shown in FIG. 1 and the data processing system 900b of the second embodiment reside in that the storage subsystem 300b includes an external connection program 323 on the memory 320, in that the data processing system 900b includes the storage subsystem 400, and in that the management computer 200b includes a volume management table having external connection information 224b on the memory 220.

The external connection program 323 is executed by the CPU 310, for mapping a volume 430 held by the storage subsystem 400 which is different from the storage subsystem 300 and coupled to the storage subsystem 300b via the SAN 530, as a volume held by the storage subsystem 300b. Examples of a method of realizing the mapping include a method disclosed in JP 2004-5370 A and a method disclosed in JP 2005-250925 A, but the method is not specifically limited.

The difference between the storage subsystem 400 and the storage subsystem 300b resides merely in that the storage subsystem 400 does not include the virtual volume 370, the pool 360, the warning notification program 322, and the external connection program 323. However, the storage subsystem 400 may include those constituent elements. Further, the storage subsystem 400 does not necessarily include the power supply control program 421.

In the second embodiment of this invention, the external connection program 323 maps volumes 431 and 432 held by the storage subsystem 400 as the volumes 332 and 334 held by the storage subsystem 300b. It should be noted that the external connection program 323 may not necessarily map volumes on a one-on-one basis. Also, the storage subsystem 300b and the storage subsystem 400 may not be associated one-to-one with each other, and one or more the storage subsystems 300b may be associated with one or more storage subsystems 400.

The volume management table having external connection information 224b is equal in most part to the volume management table 224, as shown in FIG. 13. The difference between those tables is that the volume management table having external connection information 224b includes an external connection destination unit ID 2243b and a power saving function 2245b. The external connection destination unit ID 2243b includes information for uniquely identifying a storage subsystem of external connection destination in a case where there is a volume externally connected. The power saving function 2245b includes information indicating whether the storage subsystem has a function of realizing power saving by setting a volume to the sleep state or by returning the volume to an original state. However, the external connection destination unit ID 2243b is not limited to the expression in the drawing, and may be represented by any other expression as long as information capable of uniquely identifying a storage subsystem of external connection destination is included. Also, the power saving function 2245b is not limited to the expression in the drawing.

B2. Description of Data Processing Procedure

An operation of this embodiment is similar in most part to the operation of the first embodiment of this invention, and therefore only the difference will be described hereinafter. The process sequence of the first embodiment of this invention and the process sequence of this embodiment are different in terms of evaluation flow from the viewpoint of power saving and evaluation flow from the viewpoint of response performance, which are performed by the reservation management program 222 for creating the score table 226.

Figure 14:
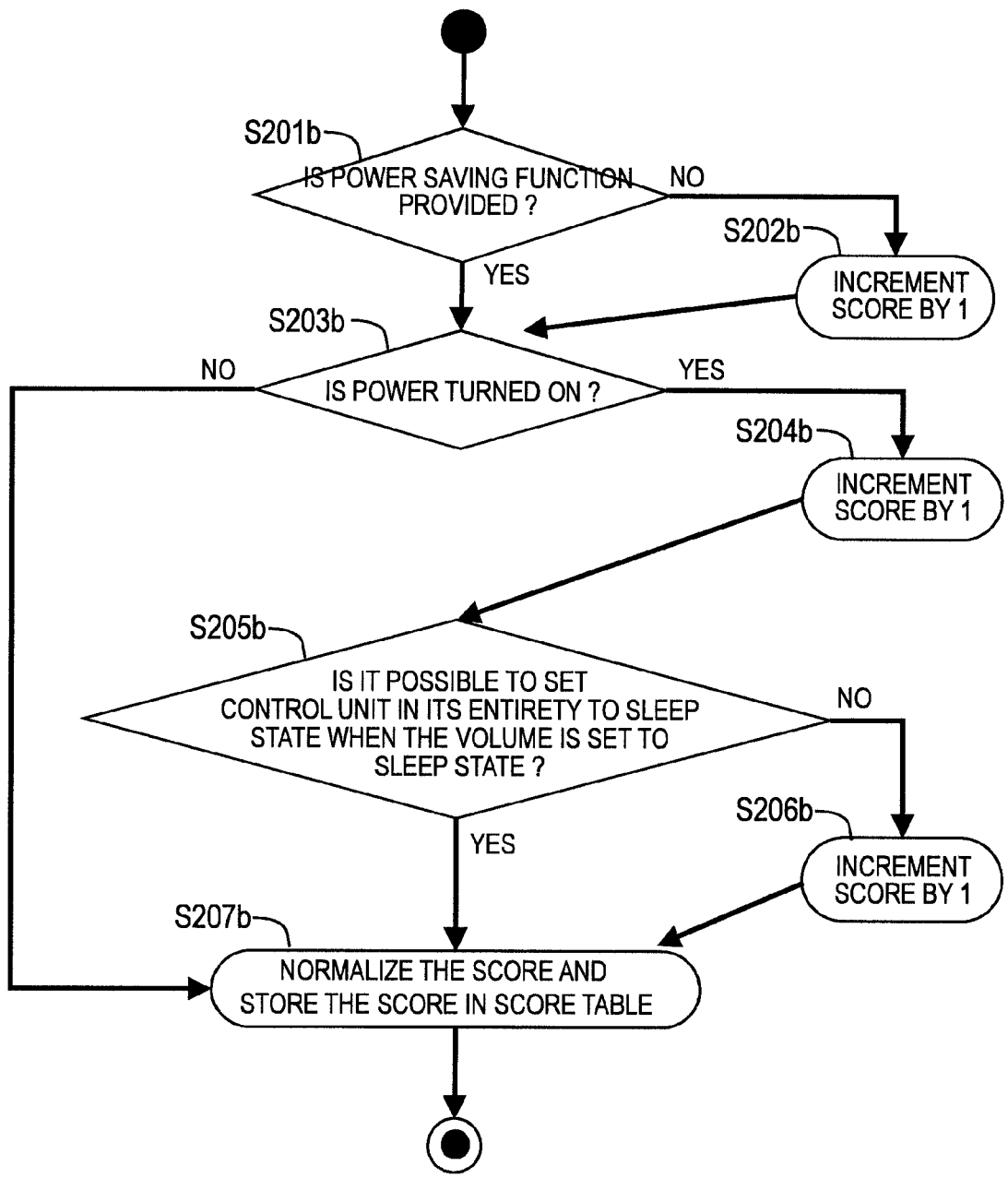
FIG. 14 is a flowchart for illustrating an example of an evaluation to be made from the viewpoint of power saving, which is executed when the reservation management program creates the score table, in a case where an external connection is provided in the second embodiment.
Figure 15:
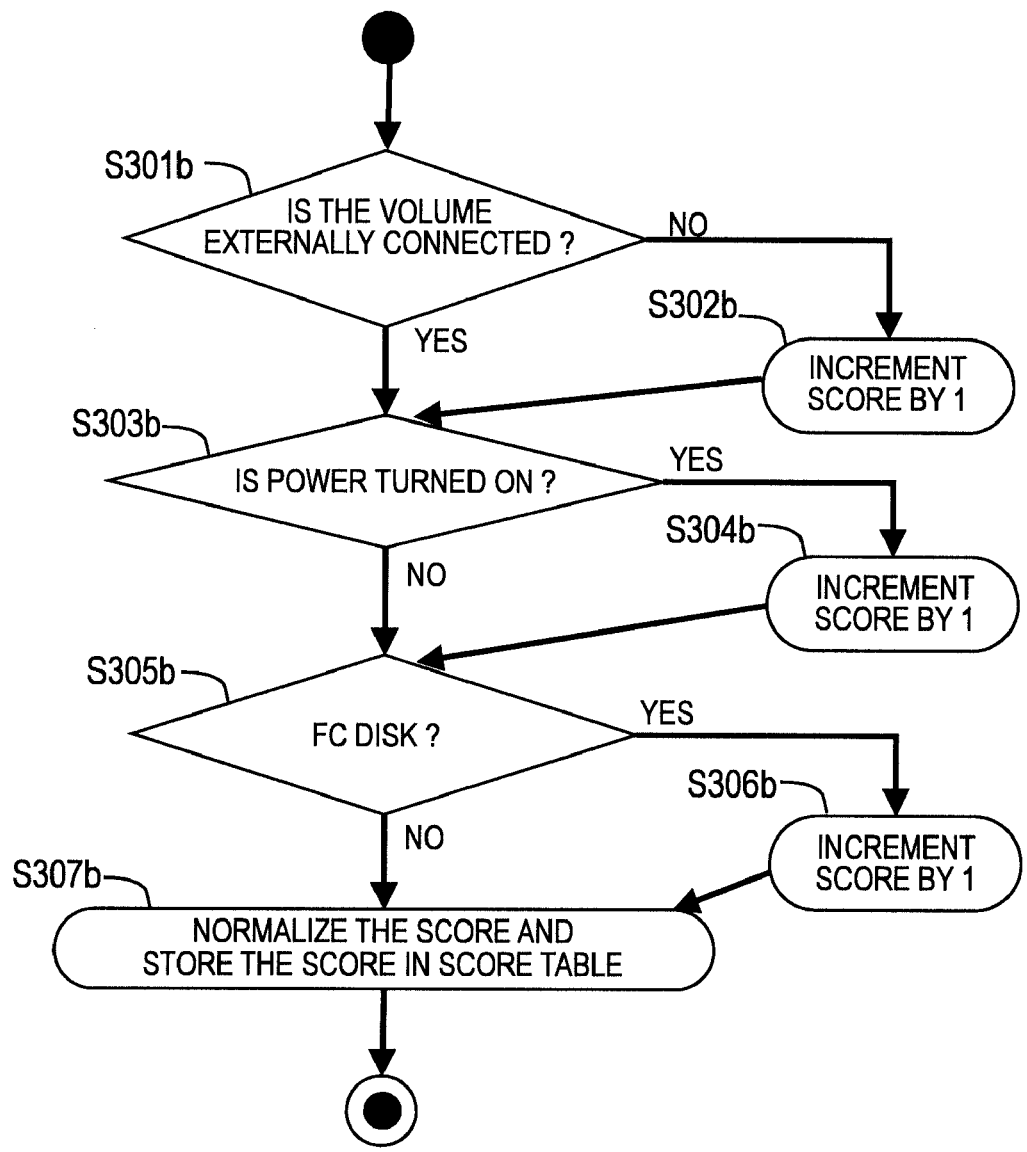
FIG. 15 is a flowchart for illustrating an example of an evaluation to be made from the viewpoint of response performance, which is executed when the reservation management program creates the score table, in a case where an external connection is provided in the second embodiment.

FIGS. 14 and 15 show an evaluation flow from the viewpoint of power saving and an evaluation flow from the viewpoint of response performance, respectively.

In FIG. 14, first in Step S201b, the reservation management program 222 refers to the volume management table having external connection information 224b and determines whether a storage subsystem including the volume has a power saving function or not. In the case where the storage subsystem has a power saving function, the score is incremented by 1 in Step S202b. In the case where the storage subsystem does not have a power saving function, the process proceeds to Step S203b.

Steps S203b, S204b, S205b, S206b, and S207b are similar to Steps S201, S202, S203, S204, S205, and S206 of FIG. 7, respectively, and therefore a description thereof will be omitted.

Through the above-mentioned processes, in addition to the score set in relation to power saving according to the first embodiment described above, a score of a storage subsystem which does not have a power saving function is added, to add the storage system which does not have a power saving function to the pool, while a storage subsystem having a power saving function is kept away from being included in the pool, so as to set a power saving state, as much as possible, to the volume, the control unit, or the storage subsystem as a whole, to thereby suppress power consumption of the entire system.

In FIG. 15, first in Step S301b, the reservation management program 222 refers to the volume management table having external connection information 224b and determines whether the volume is externally connected or not. In the case where the volume is externally connected, the process proceeds to Step S303b. In the case where the volume is not externally connected, the score is incremented by 1 in Step S302b.

Steps S303b, S304b, S305b, S306b, and S307b are similar to Steps S301, S302, S303, S304, and S305 of FIG. 8, respectively, and therefore a description thereof will be omitted.

Through the above-mentioned processes, in addition to setting the score in relation to response performance according to the first embodiment described above, a volume (local volume) in a storage subsystem 300 which also includes the control unit 305 is given a priority to be added to the pool 360, so as to keep away a volume in the external storage subsystem 400 from being added to the pool 360, which otherwise impairs the response performance as compared with a case of adding the local volume, to thereby secure the response performance of the entire system.

C. Third Embodiment

C1. System Configuration

Figure 16:
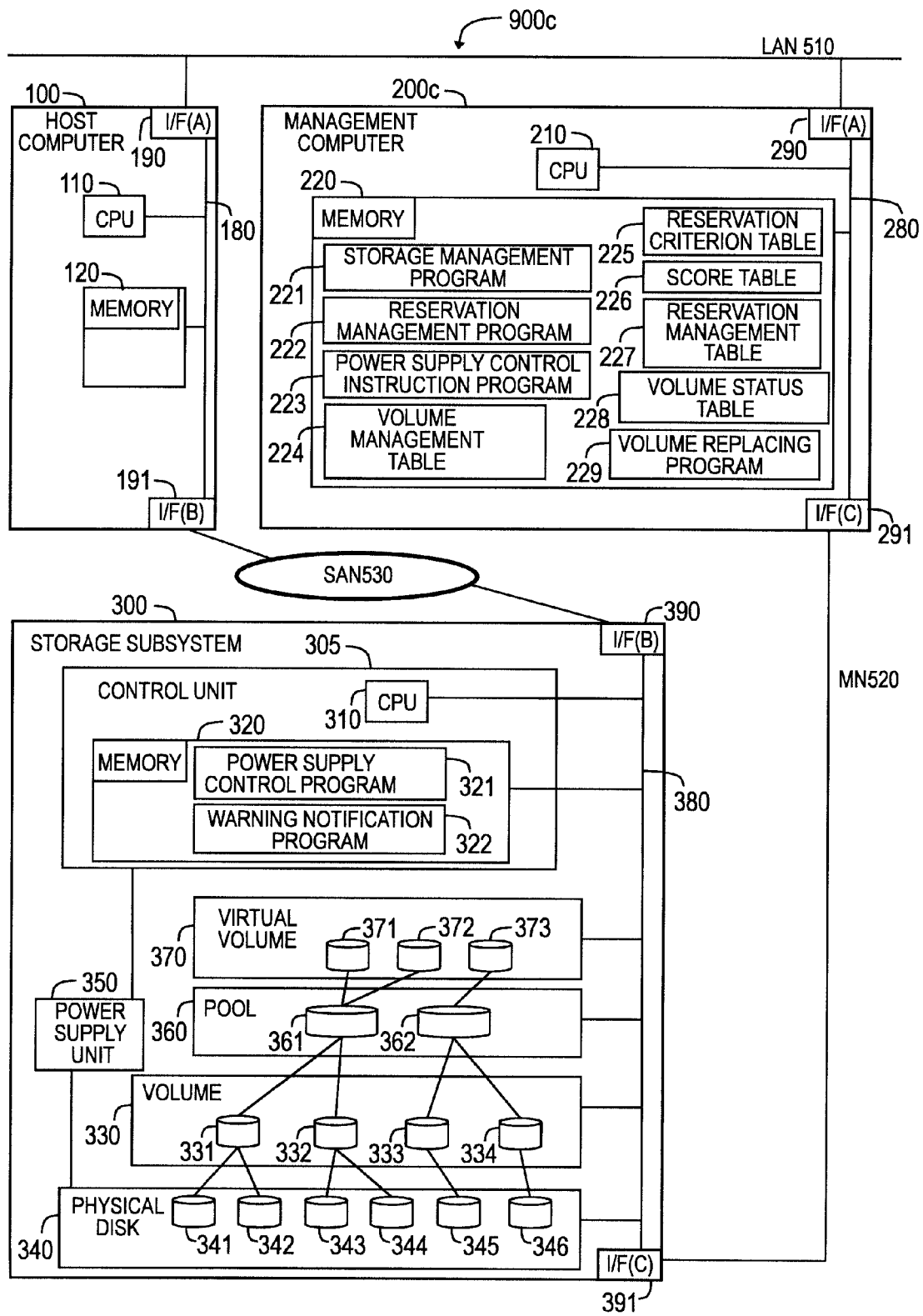
FIG. 16 is a block diagram illustrating a system configuration according to a third embodiment of this invention.

FIG. 16 is an explanatory diagram illustrating a configuration of a data processing system 900c according to a third embodiment of this invention. The data processing system 900c includes at least each one of the host computer 100, a management computer 200c, and the storage subsystem 300. The configuration of the third embodiment is similar in most part to the configuration of the first embodiment, and therefore merely the difference will be described hereinafter.

The difference between the data processing system 900 shown in FIG. 1 and the data processing system 900c of the third embodiment of this invention resides in that the management computer 200c includes a volume status table 228 and a volume replacing program 229 on the memory 220.

The volume status table 228 includes, as shown in FIG. 17, a device ID 2280 for identifying a storage subsystem 300, a logical unit number (LUN) 2281 which is an identification number of a volume 330, a capacity 2282 of the volume 330, a disk type 2283 of a physical disk forming the volume 330, a registration destination resource ID 2284 for identifying a registration destination resource of the volume 330, a use status 2285 indicating whether the volume 330 is reserved or not, a power supply status 2286 of the volume 330, a path flag 2287 indicating whether the volume 330 is allocated to the host computer 100 or not (that is, whether a path is provided or not), and a format flag 2288 indicating whether the volume 330 is formatted or not. It should be noted, however, that the device ID 2280 and the LUN 2281 are not limited to the expressions in the drawing, and may be represented by any other expressions as long as information capable of uniquely identifying each of the storage subsystem 300 and the volume 330 is included. Also, the capacity 2282, the disk type 2283, the registration destination resource ID 2284, the use status 2285, the power supply status 2286, the path flag 2287, and the format flag 2288 are not limited to the expressions in the drawing. Further, in FIG. 17, the registration destination resource ID 2284 includes, by way of example, information for identifying a pool 360, but the registration destination resource is not limited to the pool 360.

The volume replacing program 229 is executed by the CPU 210, for replacing a volume that is neither reserved in the reservation management table 227 nor used as a pool volume (hereinafter, referred to as unused volume) with a reserved volume, and for replacing an unused volume with a pool volume. Examples of a method of implementing the volume replacement include technologies disclosed in JP 2000-293317 A, U.S. Pat. No. 6,108,748, JP 2003-345522 A, and the like, but the method is not specifically limited.

C2. Description of Data Processing Procedure

Figure 18:
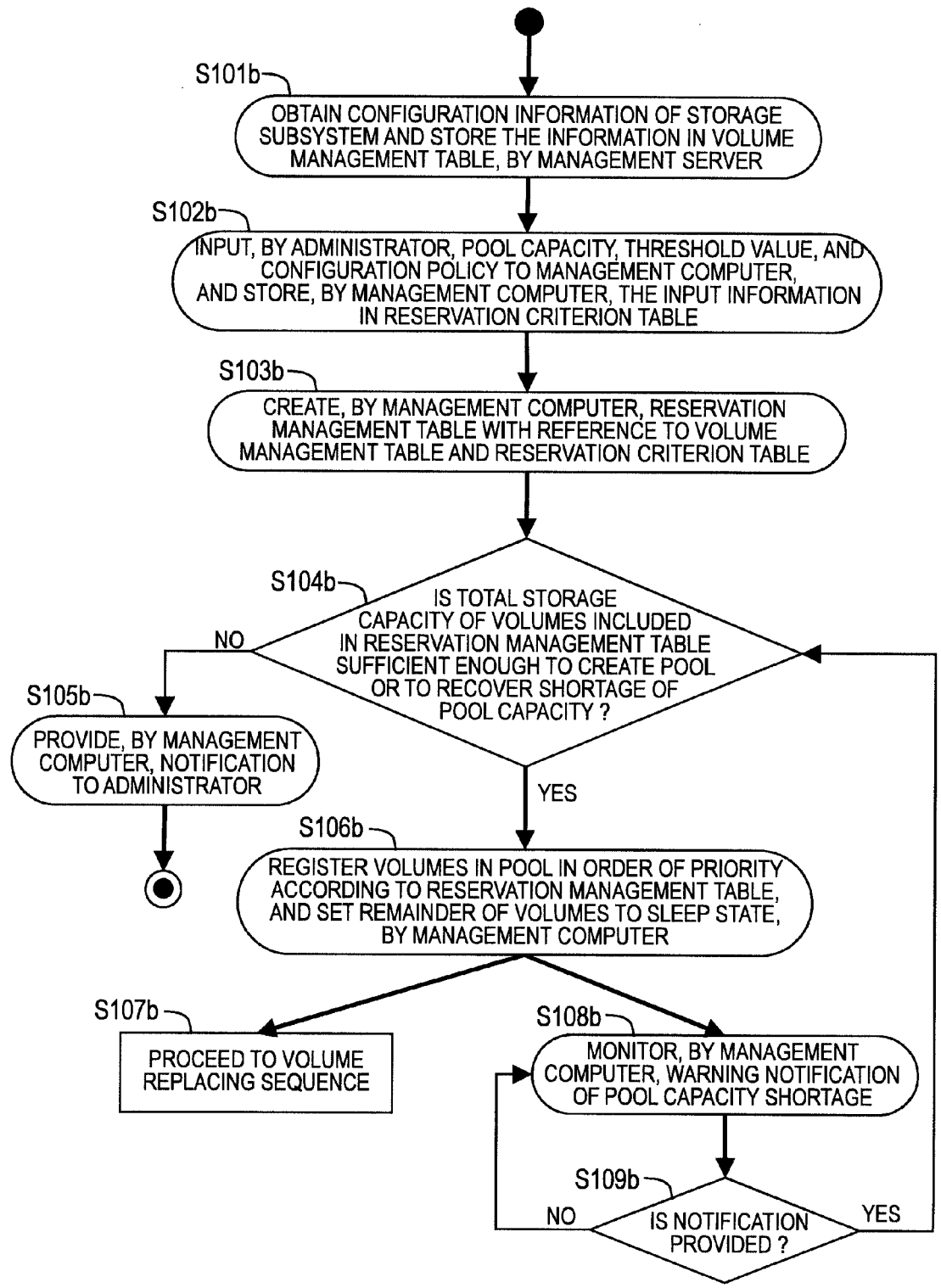
FIG. 18 is a flowchart for illustrating an outline of a process to be executed by the management computer according to the third embodiment.

An operation of the third embodiment is similar in most part to the operation of the first embodiment, and therefore only the difference will be described hereinafter. FIG. 18 shows an outline of a process sequence performed in the management computer 200c of the third embodiment.

The difference between the process sequence of FIG. 18 and the process sequence according to the first embodiment described above shown in FIG. 6 resides merely in that the processes of Step S107 and Step S108 of FIG. 6 are replaced by a process of Step 107b in FIG. 18.

In FIG. 6, the storage management program 221 on the management computer 200 monitors, in Step S107, configuration change in the storage subsystem 300, to judge, in Step S108, whether any change has occurred in the configuration, and the process proceeds to one of Step S109 and Step S107 according to the result of the judgment. In contrast to this, in FIG. 18, the process proceeds, in Step S107b, to a volume replacing sequence.

Figure 19:
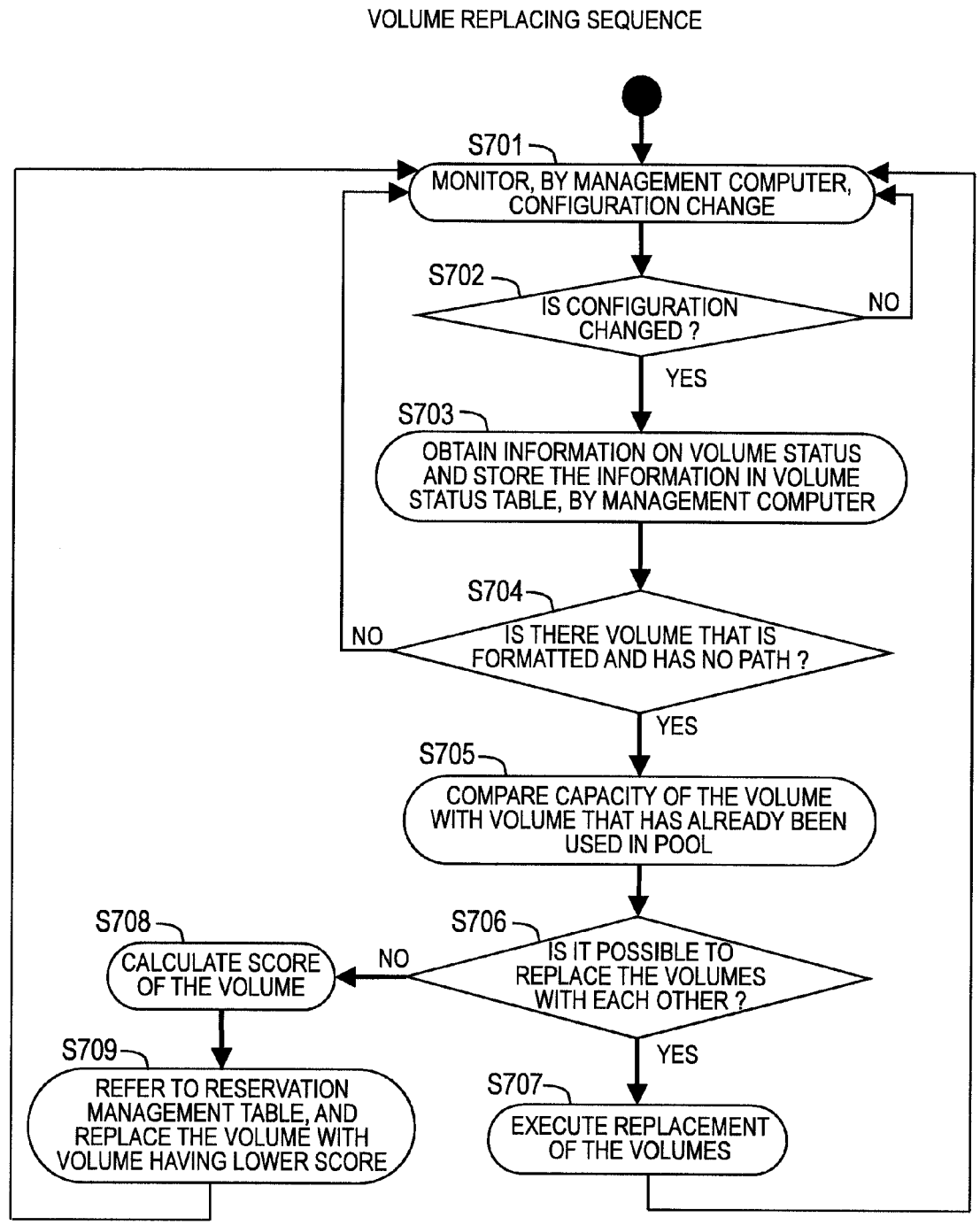
FIG. 19 is a flowchart for illustrating an example of a process to be performed when a volume replacement program replaces volumes according to the third embodiment.

FIG. 19 shows the volume replacing sequence. In FIG. 19, first in Step S701, the storage management program 221 on the management computer 200 monitors configuration change in the storage subsystem 300.

In Step S702, the storage management program 221 judges whether or not any change has occurred in the configuration of the storage subsystem 300, and in the case where the configuration has been changed, the process proceeds to Step S703. In the case where the configuration remains unchanged, the process proceeds to Step S701.

In Step S703, the storage management program 221 obtains information on a status of the volume 330 from the storage subsystem 300, and updates the volume status table 228.

In Step S704, the storage management program 221 judges, with reference to the volume status table 228, whether or not there is a volume that is formatted and has no path (unused volume). In the case where there is an unused volume, the process proceeds to Step S705. In the case where there is no unused volume, the process proceeds to Step S701.

In Step S705, the storage management program 221 compares, with reference to the volume status table 228, the capacity of the volume that has satisfied the condition in Step S704 with the capacity of a volume that has already been registered for the pool 360.

In Step S706, the storage management program 221 determines whether it is possible to interchange the volumes which have been compared with each other in Step S705. Examples of a method of determining whether it is possible to interchange the volumes include a method of determining that the volumes are interchangeable in the case where the original volume is smaller in capacity than a volume which is to replace the original volume, and a method in which the volumes are compared with each other in terms of quality of service (QoS) such as redundancy or response performance and it is determined that the volumes are interchangeable in the case where the original volume is inferior in terms of QoS to a volume which is to replace the original volume, but the method is not specifically limited.

In the case where the volumes are interchangeable, the volume replacing program 229 interchanges the volumes in Step S707.

In the case where the volumes are not interchangeable, the reservation management program 222 calculates, in Step S708, a score for the volume that has satisfied the condition in Step S704. A process of calculating the score is similar to that in the first embodiment.

Lastly, in Step S709, the volume replacing program 229 refers to the reservation management table 227, and in the case where the reservation management table 227 includes a volume having a score lower than the score of the volume that has satisfied the condition in Step S704, the volume replacing program 229 replaces those volumes with each other.

As described above, the management computer 200 monitors configuration change in the storage subsystem 300, and in the case where the configuration has been changed, a volume to be reserved or a volume to be used as the pool volume is replaced with an unused volume, thereby making it possible to use an optimal volume as the pool volume according to the configuration change in the storage subsystem 300. In particular, in view of power saving, a volume which is not suitable for power saving is positively used as the pool volume while setting the power supply status of a volume which is suitable for power saving to the sleep state, to thereby suppress power consumption in the storage subsystem 300.

It should be noted that, in each of the above-mentioned embodiments, the physical disk (physical drive) 340 is not limited to a hard disk drive, and may also adopt a solid state drive (SSD).

(Supplemental Remarks)

A program executed by a management computer including:

a management unit; and a reservation management unit, the management unit managing a storage system which includes one or more physical drives, one or more storage regions formed of the physical drives, a storage region pool formed of the one or more storage regions, and a warning notification unit for notifying a waning to the management computer when an amount used in a capacity of the storage region pool becomes equal to or larger than a predetermined threshold value, the reservation management unit for reserving the one or more storage regions for the storage region pool, the program controlling the management computer to execute the procedures of:

assigning, by the management unit, priorities to the one or more storage regions of the storage system, when creating the storage region pool of the storage system, based on at least one criterion set in advance by the reservation management unit of the management computer;

reserving, by the reservation management unit, the storage regions capable of satisfying the capacity of the storage region pool, according to the priorities;

creating, by the management unit, the storage region pool from the reserved storage regions;

monitoring, by the management unit, an amount of use in the capacity of the storage region pool of the storage system;

judging through a comparison between the amount of use in the capacity of the storage region pool of the storage system and a threshold value set in advance, by the management unit, whether the amount of use has become equal to or larger than the threshold value;

issuing a warning when it has been judged that the amount of use has become equal to or larger than the threshold value.

While the present invention has been described in detail and pictorially in the accompanying drawings, the present invention is not limited to such detail but covers various obvious modifications and equivalent arrangements, which fall within the purview of the appended claims.

What is claimed is:

1. A configuration optimization method for a storage system in a computer system comprising:

a storage system;

a host computer; and a management computer, the storage system including one or more physical drives, one or more storage regions formed of the one or more physical drives, a storage region pool formed of the one or more storage regions, and a warning notification unit for notifying a warning to the management computer when an amount used in a capacity of the storage region pool becomes equal to or larger than a threshold value set in advance, the host computer including a storage region allocated by the storage system, the management computer including a management unit for managing the storage system and a reservation management unit for reserving the one or more storage regions for the storage region pool, the configuration optimization method for the storage system comprising the steps of:

assigning, by the management unit of the management computer, priorities to the one or more storage regions of the storage system, when creating the storage region pool of the storage system, based on at least one criterion set in advance by the reservation management unit of the management computer;

reserving, by the reservation management unit, storage regions capable of satisfying the capacity of the storage region pool, according to the priorities;

creating, by the management unit, the storage region pool from the reserved storage regions;

monitoring, by the warning notification unit, an amount of use in the capacity of the storage region pool of the storage system;

judging, through a comparison between the amount of use in the capacity of the storage region pool of the storage system and the threshold value set in advance, by the warning notification unit, whether the amount of use has become equal to or larger than the threshold value;

notifying, by the warning notification unit, when it has been judged that the amount of use has become equal to or larger than the threshold value, a warning to the management computer; and adding, by the management unit of the management computer, upon receiving the warning from the warning notification unit of the storage unit, storage regions capable of satisfying the threshold value, of the reserved storage regions, to the storage region pool, further comprising notifying, by the management computer, a second warning in a case where a capacity of the storage regions reserved by the management unit of the management computer is equal to or less than a second threshold value set in advance when the warning is received from the warning notification unit.

2. The configuration optimization method for a storage system according to claim 1, wherein the management unit of the management computer assigns priorities to the one or more storage regions of the storage system based on power consumption of the storage unit.

3. The configuration optimization method for a storage system according to claim 1, wherein the management unit of the management computer assigns priorities to the one or more storage regions of the storage system based on response performance with respect to access to the one or more storage regions.

4. The configuration optimization method for a storage system according to claim 1, wherein the management unit of the management computer assigns priorities to the one or more storage regions of the storage system based on cost of the one or more storage regions.

5. The configuration optimization method for a storage system according to claim 1, wherein the management unit of the management computer assigns priorities to the one or more storage regions of the storage system based on access balancing degree of the one or more storage regions.

6. The configuration optimization method for a storage system according to claim 1, wherein:
the management computer further includes:
a monitoring unit for monitoring configuration change in the storage system; and
a replacing unit for performing, with respect to a plurality of storage regions, a process of replacing data stored in the plurality of storage regions and information on the plurality of storage regions; and
the configuration optimization method for the storage system further comprises the steps of:
monitoring, by the monitoring unit, configuration change in the storage system; and
replacing, by the replacing unit, when the configuration of the storage system has changed, one of a storage region reserved and a storage region being used in the storage region pool, with a storage region unused in the storage system.

7. The configuration optimization method for a storage system according to claim 1, wherein:
the storage system further includes a power supply control unit for controlling power to be supplied to the one or more physical drives; and
the step of creating, by the management unit of the management computer, the storage region pool from the reserved storage regions further comprises the steps of:
providing an instruction to the power supply control unit of the storage system, as to a storage region which is excluded from the storage region pool, of the reserved storage regions, to set a physical drive forming the storage region to a sleep state; and
setting, by the power supply control unit of the storage system upon receiving the instruction, the physical drive forming the storage region which is excluded from the storage region pool, to the sleep state.

8. The configuration optimization method for a storage system according to claim 1, wherein:
the storage system further includes a power supply control unit for controlling power to be supplied to the one or more physical drives;
the step of creating, by the management unit of the management computer, the storage region pool from the reserved storage regions further comprises the steps of:
providing an instruction to the power supply control unit of the storage system, as to a storage region which is excluded from the storage region pool, of the reserved storage regions, to set a physical drive forming the storage region to a sleep state; and
setting, by the power supply control unit of the storage system upon receiving the instruction, the physical drive forming the storage region which is excluded from the storage region pool, to the sleep state; and
the step of adding, by the management unit of the management computer, when it has been judged that the amount of use has become equal to or larger than the threshold value, storage regions capable of satisfying the threshold value, of the reserved storage regions, to the storage region pool, further comprises the steps of:
notifying, by the management unit of the management computer, an instruction to cancel the sleep state set to the physical drive forming the storage region to be added to the storage region pool, to the power supply control unit of the storage system;
canceling, by the power supply control unit of the storage system upon receiving the instruction, the sleep state set to the physical drive forming the storage region designated by the instruction; and
adding, by the reservation management unit, the storage region formed of the physical drive having the sleep state canceled, to the storage region pool.

9. The configuration optimization method for a storage system according to claim 1, wherein:
the computer system further includes a second storage system which has storage regions to be mapped by an external connection unit of the storage system;
the step of assigning priorities further comprises assigning priorities to the one or more storage regions of the storage system and the storage regions of the second storage system, based on at least one criterion set by the reservation management unit of the management computer in advance;
the step of reserving the storage regions further comprises reserving, by the reservation management unit, storage regions of the storage system and storage regions of the second storage system which are capable of satisfying the capacity of the storage region pool, according to the priorities;
the step of creating the storage region pool further comprises creating, by the management unit, the storage region pool from the reserved storage regions of the storage system and the reserved storage regions of the second storage system;
the step of monitoring an amount of use in the capacity of the storage region pool further comprises monitoring, by the management unit, an amount of use in the capacity of the storage region pool which includes the storage regions of the storage system and the storage regions of the second storage system;

the step of judging whether the amount of use has become equal to or larger than the threshold value further comprises judging, by the management unit, through a comparison between the amount of use in the capacity of the storage region pool which includes the storage regions of the storage system and the storage regions of the second storage system and a threshold value set in advance, whether the amount of use has become equal to or larger than the threshold value; and the step of adding storage regions capable of satisfying the threshold value, to the storage region pool further comprises adding, of the storage regions of the storage system and the storage regions of the second storage system reserved by the management unit of the management computer, storage regions capable of satisfying the threshold value, to the storage region pool.

10. A computer system, comprising:

a storage system;

a host computer; and a management computer, the storage system including one or more physical drives, one or more storage regions formed of the one or more physical drives, a storage region pool formed of the one or more storage regions, and a warning notification unit for notifying a warning to the management computer when an amount of use in a capacity of the storage region pool has become equal to or larger than a threshold value set in advance, the host computer including a storage region allocated by the storage system, the management computer including a management unit for managing the storage system and a reservation management unit for reserving the one or more storage regions for the storage region pool, wherein:

the reservation management unit of the management computer assigns, when the management unit of the management computer creates the storage region pool of the storage system, priorities to the one or more storage regions of the storage system based on at least one criterion;

the reservation management unit reserves, according to the priorities, storage regions capable of satisfying the capacity of the storage region pool;

the management unit creates the storage region pool from at least one of the reserved storage regions;

the warning notification unit notifies, when the amount of use in the capacity of the storage region pool of the storage system has become equal to or larger than a threshold value set in advance, a warning to the management computer; and the management unit of the management computer adds, upon receiving the warning, storage regions capable of satisfying the threshold value, of the reserved storage regions, to the storage region pool, wherein the management computer further includes a second warning notification unit for notifying a second warning in a case where a capacity of the storage regions reserved by the management unit of the management computer is equal to or less than a second threshold value set in advance when the warning is received from the warning notification unit.

11. The computer system according to claim 10, wherein: the management computer further includes:

a monitoring unit for monitoring configuration change in the storage system; and a replacing unit for performing, with respect to a plurality of storage regions, a process of replacing data stored in the plurality of storage regions and information on the plurality of storage regions, when the monitoring unit has detected a configuration change in the storage system; and the replacing unit replaces one of a storage region reserved and a storage region being used in the storage region pool, with a storage region unused in the storage system.

12. The computer system according to claim 10, wherein:

the storage system further includes a power supply control unit for controlling power to be supplied to the one or more physical drives;

the management computer further includes a power supply control instruction unit for providing an instruction to the power supply control unit of the storage system, as to a storage region which is excluded from the storage region pool, of the reserved storage regions, to set a physical drive forming the storage region to a sleep state; and the power supply control unit of the storage system sets, according to the instruction received, the physical drive forming the storage region excluded from the storage region pool, to the sleep state.

13. The computer system according to claim 12, wherein when the management unit of the management computer adds, of the storage regions reserved, storage regions capable of satisfying the capacity of the threshold value to the storage region pool, the power supply control instruction unit cancels the sleep state set to physical drives forming the storage regions to be added, and the management unit adds the storage regions to the storage region pool after the sleep state is canceled.

14. The computer system according to claim 10, further comprising a second storage system which has storage regions to be mapped by an external connection unit of the storage system, wherein:

the reservation management unit assigns priorities to the one or more storage regions of the storage system and the storage regions of the second storage system based on at least one criterion, and reserves, according to the priorities, storage regions capable of satisfying the capacity of the storage region pool, of the storage regions of the storage system and the storage regions of the second storage system; and the management unit creates the storage region pool from at least one of the reserved storage regions.

15. A management computer, comprising:

a management unit; and a reservation management unit, the management unit managing a storage system which includes one or more physical drives, one or more storage regions formed of the one or more physical drives, a storage region pool formed of the one or more storage regions, and a warning notification unit for notifying a warning to the management computer when an amount used in a capacity of the storage region pool becomes equal to or larger than a threshold value set in advance, the reservation management unit reserving the storage regions for the storage region pool, wherein:

the reservation management unit of the management computer assigns, when the management unit creates the storage region pool of the storage system, priorities to the one or more storage regions of the storage system based on at least one criterion;

the reservation management unit reserves, according to the priorities, storage regions satisfying the capacity of the storage region pool;

the management unit creates the storage region pool from at least one of the reserved storage regions; and the management unit of the management computer adds, upon receiving a warning that the amount used in the capacity of the storage region pool of the storage system has become equal to or larger than the threshold value set in advance, storage regions capable of satisfying the capacity of the threshold value, of the reserved storage regions, to the storage region pool, further comprising a second warning notification unit for notifying a second warning in a case where a capacity of the storage regions reserved by the management unit of the management computer is equal to or less than a second threshold value set in advance when the warning is received from the warning notification unit.

16. The management computer according to claim 15, further comprising:

a monitoring unit for monitoring configuration change in the storage system; and a replacing unit for performing, with respect to a plurality of storage regions, a process of replacing data stored in the plurality of storage regions and information on the plurality of storage regions, when the monitoring unit has detected a configuration change in the storage system, wherein the replacing unit replaces one of a storage region reserved and a storage region being used in the storage region pool, with a storage region unused in the storage system.

17. The management computer according to claim 15, further comprising a power supply control instruction unit for providing an instruction to the power supply control unit of the storage system, as to a storage region which is excluded from the storage region pool, of the reserved storage regions, to set a physical drive forming the storage region to a sleep state.

* * * * *